US011314440B1

(12) United States Patent
Wang et al.

(10) Patent No.: US 11,314,440 B1
(45) Date of Patent: Apr. 26, 2022

(54) DISTRIBUTED OBJECT STORAGE SUPPORTING DIFFERENCE-LEVEL SNAPSHOTS

(71) Applicant: VMware, Inc., Palo Alto, CA (US)

(72) Inventors: Wenguang Wang, Santa Clara, CA (US); Vamsidhar Gunturu, Cupertino, CA (US); Junlong Gao, Palo Alto, CA (US); Ilya Languev, Palo Alto, CA (US); Petr Vandrovec, Cupertino, CA (US); Maxime Austruy, Pully (CH); Ilia Sokolinski, Brighton, MA (US); Satish Pudi, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 5 days.

(21) Appl. No.: 17/072,904

(22) Filed: Oct. 16, 2020

(51) Int. Cl.
*G06F 3/06* (2006.01)
*G06F 9/455* (2018.01)

(52) U.S. Cl.
CPC ............ *G06F 3/065* (2013.01); *G06F 3/0604* (2013.01); *G06F 3/067* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| 9,390,154 | B1 * | 7/2016 | Baird, III | G06F 16/27 |
| 2010/0223441 | A1 * | 9/2010 | Lillibridge | G06F 3/0631 711/165 |
| 2013/0018851 | A1 * | 1/2013 | Jayaraman | G06F 3/0641 707/692 |
| 2021/0034578 | A1 * | 2/2021 | Dalmatov | G06F 16/1752 |

* cited by examiner

Primary Examiner — Brian R Peugh
(74) Attorney, Agent, or Firm — Dentons US LLP

(57) ABSTRACT

Techniques for the increased efficiency of storing data objects storage in the object storage of a software designed data center (SDDC) are provided. The techniques include the efficient storage of data, while enabling snapshots of each updating of the data. The snapshots of the data may be efficiently recovered via the techniques. Difference-level mappings for each snapshot are encoded in compact self-balancing data trees included in the object's metadata. The metadata mappings include mappings between various address spaces employed by the SDDC, as well as the address spaces employed by data stores that store the data on physical medium. Because the metadata is efficiently structured, the metadata for an object may be cached for quick lookups during data access and/or snapshot recovery. The techniques also provide low-latency recovery and/or system rollback in the event of any failure in the SDDC.

30 Claims, 9 Drawing Sheets

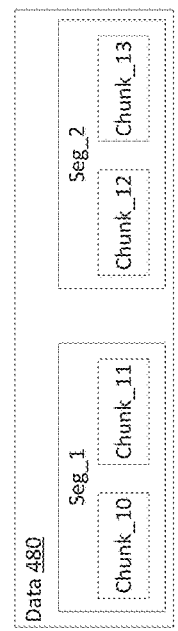
FIG. 4A
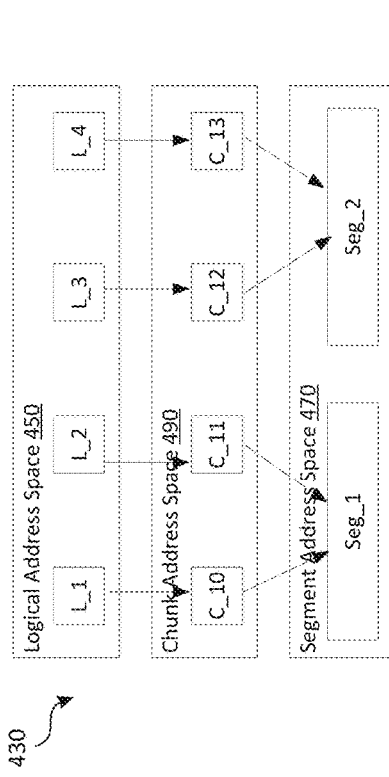
FIG. 4B
FIG. 4D
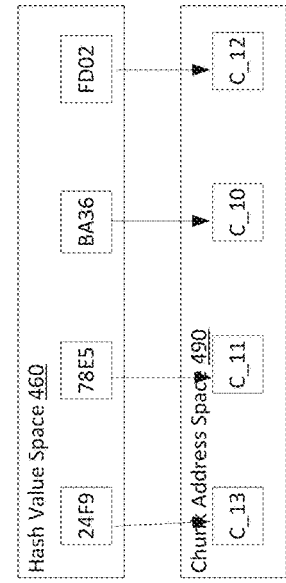
FIG. 4E
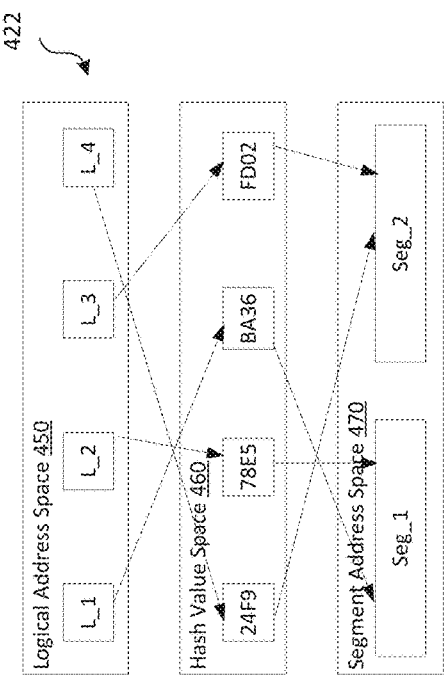
FIG. 4C

DISTRIBUTED OBJECT STORAGE SUPPORTING DIFFERENCE-LEVEL SNAPSHOTS

FIELD

The present disclosure relates generally to distributed-computing systems and, more specifically, to methods and systems that enable storing data objects in an object store in a distributed software designed data center (SDDC), where the SDDC supports difference-level snapshots of the stored data objects.

BACKGROUND

Modern computing systems provide distributed data center services. Such services may be provided by a software designed data center (SDDC) that may implement one or more virtual storage area networks (e.g., a vSAN) and a virtual disk file system (e.g., a vDFS). Many of these distributed systems struggle to meet the ever-increasing needs of their users, such as high storage efficiency for vast quantities of data, high demands for system bandwidth, recoverability for lost data, and low-latency in the event of system failures. Attempts at optimizing conventional systems for enhanced performance in any one of these system requirements may compromise the performance in one or more of the other system requirements. Thus, there is a need for enhanced efficiencies for such distributed systems.

OVERVIEW

Described herein are techniques for the efficient storage and recovery of difference-level snapshots for data objects. In one embodiment, a method for storing data on a distributed computing system is performed. The method may include receiving data of a data object. The data may be structured as an ordered set of data blocks. The data may be subdivide into an ordered set of data chunks. Each chunk in the set of data chunks may include an ordered subset of the set of data blocks. A next chunk of the set of data chunks may be selected. The selection of the next chunk may be based on at least one of the order of the set of chunks or a previous chunk identifier for a previously selected chunk of the set of chunks. A key for the next chunk may be generated based on an indication of an initial block of the next chunk. A value for the key may be generated. The value may be based on a number of blocks included in the next chunk. The value may be further based on at least one of a next chunk identifier for the next chunk or another chunk identifier for a duplicated chunk. Metadata for the data object may be updated to indicate an association between the key for the next chunk and the value for the key.

In one embodiment, a non-transitory computer-readable storage medium storing one or more programs configured to be executed by one or more processors is provided. The one or more programs stored by the non-transitory computer-readable storage medium include instructions for performing operations that are executable by a distributed computing system. The operations may include receiving data of a data object. The data may be structured as an ordered set of data blocks. The data may be subdivided into an ordered set of data chunks. Each chunk in the set of data chunks may include an ordered subset of the set of data blocks. A next chunk of the set of data chunks may be selected. The selection of the next chunk may be based on at least one of the order of the set of chunks or a previous chunk identifier for a previously selected chunk of the set of chunks. A key for the next chunk may be generated based on an indication of an initial block of the next chunk. A value for the key may be generated. The value may be based on a number of blocks included in the next chunk. The value may be further based on at least one of a next chunk identifier for the next chunk or another chunk identifier for a duplicated chunk. Metadata for the data object may be updated to indicate an association between the key for the next chunk and the value for the key.

In one embodiment, a distributed computing system for storing data may include one or more processors and memory. The memory may store one or more programs configured to be executed by the one or more processors. The one or more programs include instructions for performing operations comprising receiving data of a data object. The data may be structured as an ordered set of data blocks. The data may be subdivided into an ordered set of data chunks. Each chunk in the set of data chunks may include an ordered subset of the set of data blocks. A next chunk of the set of data chunks may be selected. The selection of the next chunk may be based on at least one of the order of the set of chunks or a previous chunk identifier for a previously selected chunk of the set of chunks. A key for the next chunk may be generated based on an indication of an initial block of the next chunk. A value for the key may be generated. The value may be based on a number of blocks included in the next chunk. The value may be further based on at least one of a next chunk identifier for the next chunk or another chunk identifier for a duplicated chunk. Metadata for the data object may be updated to indicate an association between the key for the next chunk and the value for the key.

In another embodiment, a method for uploading a first snapshot of a data object to an accessible data store is provided. The method may include identifying, within data of the data object, a first set of data blocks of the first snapshot. The first set of data blocks may include at least a first block and a second block. Each block of the first set of data blocks may include data that is different from data of a corresponding block of a previous snapshot. The previous snapshot may be a snapshot of the object that was taken previous to the first snapshot. An indication of a first snapshot identifier for the first snapshot and an indication of the first block may be encoded within first metadata of the first snapshot. The method may include uploading the first snapshot. While uploading the first snapshot, the first block may be uploaded to the data store. While uploading the first snapshot, and subsequent to uploading the first block, it may be determined that the data store has become inaccessible. In such an event, an indication that the first snapshot is an incomplete snapshot may be encoded within the first metadata for the first snapshot. In response to determining that the data store has become inaccessible, the uploading of the first snapshot may be terminated. Subsequent to terminating the uploading of the first snapshot, it may be determined that the data store has again become accessible subsequent to the data store becoming inaccessible while uploading the first complete snapshot In response to determining that the data store is again accessible, uploading a second snapshot of the data object may be initiated. A second snapshot identifier for the second snapshot of the data object may be generated. While uploading the second snapshot, the second block may be uploaded to the data store. An indication of the second snapshot identifier, an indication of the second block, and an indication that the second snapshot is a complete snapshot may be encoded within second metadata for the second snapshot.

In one embodiment, a non-transitory computer-readable storage medium storing one or more programs configured to be executed by one or more processors is provided. The one or more programs stored by the non-transitory computer-readable storage medium include instructions for performing operations that are executable by a distributed computing system that includes an accessible data store. The operations may be for uploading a first snapshot of a data object to the accessible data store. The operations may include identifying, within data of the data object, a first set of data blocks of the first snapshot. The first set of data blocks may include at least a first block and a second block. Each block of the first set of data blocks may include data that is different from data of a corresponding block of a previous snapshot. The previous snapshot may be a snapshot of the object that was taken previous to the first snapshot. An indication of a first snapshot identifier for the first snapshot and an indication of the first block may be encoded within first metadata of the first snapshot. The operations may include uploading the first snapshot. While uploading the first snapshot, the first block may be uploaded to the data store. While uploading the first snapshot, and subsequent to uploading the first block, it may be determined that the data store has become inaccessible. In such an event, an indication that the first snapshot is an incomplete snapshot may be encoded within the first metadata for the first snapshot. In response to determining that the data store has become inaccessible, the uploading of the first snapshot may be terminated. Subsequent to terminating the uploading of the first snapshot, it may be determined that the data store has again become accessible subsequent to the data store becoming inaccessible while uploading the first complete snapshot In response to determining that the data store is again accessible, uploading a second snapshot of the data object may be initiated. A second snapshot identifier for the second snapshot of the data object may be generated. While uploading the second snapshot, the second block may be uploaded to the data store. An indication of the second snapshot identifier, an indication of the second block, and an indication that the second snapshot is a complete snapshot may be encoded within second metadata for the second snapshot.

In still another embodiment, a distributed computing system may be for uploading a first snapshot of a data object to an accessible data store. The system may include one or more processors and memory. The memory may store one or more programs configured to be executed by the one or more processors. The one or more programs include instructions for performing operations comprising identifying, within data of the data object, a first set of data blocks of the first snapshot. The first set of data blocks may include at least a first block and a second block. Each block of the first set of data blocks may include data that is different from data of a corresponding block of a previous snapshot. The previous snapshot may be a snapshot of the object that was taken previous to the first snapshot. An indication of a first snapshot identifier for the first snapshot and an indication of the first block may be encoded within first metadata of the first snapshot. The operations may include uploading the first snapshot. While uploading the first snapshot, the first block may be uploaded to the data store. While uploading the first snapshot, and subsequent to uploading the first block, it may be determined that the data store has become inaccessible. In such an event, an indication that the first snapshot is an incomplete snapshot may be encoded within the first metadata for the first snapshot. In response to determining that the data store has become inaccessible, the uploading of the first snapshot may be terminated. Subsequent to terminating the uploading of the first snapshot, it may be determined that the data store has again become accessible subsequent to the data store becoming inaccessible while uploading the first complete snapshot In response to determining that the data store is again accessible, uploading a second snapshot of the data object may be initiated. A second snapshot identifier for the second snapshot of the data object may be generated. While uploading the second snapshot, the second block may be uploaded to the data store. An indication of the second snapshot identifier, an indication of the second block, and an indication that the second snapshot is a complete snapshot may be encoded within second metadata for the second snapshot.

BRIEF DESCRIPTION OF THE DRAWINGS

FIG. 4A is a block diagram illustrating a data structure for a data object, in accordance with some embodiments.

FIG. 4B is a block diagram illustrating a chunked data object, in accordance with some embodiments.

FIG. 4C is a block diagram illustrating content aware addressing of data chunks, in accordance with some embodiments.

FIG. 4D is a block diagram illustrating a mapping between a logical address space, a chunk address space, and a segment address space, in accordance with some embodiments.

FIG. 4E is a block diagram illustrating content aware addressing of data chunks, in accordance with some embodiments.

DETAILED DESCRIPTION

In the following description of embodiments, reference is made to the accompanying drawings in which are shown by way of illustration specific embodiments that can be practiced. It is to be understood that other embodiments can be used and structural changes can be made without departing from the scope of the various embodiments.

Distributed computing systems, such as software designed data centers (SDDCs), may implement one or more virtual storage area networks (vSANs) and one or more virtual disk file systems (vDFS). A user of an SDDC may request that a data object be stored by and/or updated in a storage system. A data object may include data, as well as metadata. The data may be the data that the user actually is interested in, while the metadata encodes various aspects of the data. Such aspects of the metadata include but are not limited to information indicating a location in virtual and/or physical storage (e.g., an address), where the data may be located. Due to the architecture of object storage systems, once committed to storage, the data of a data object may not be overwritten and/or modified. Accordingly, as an object is updated via various edits to the data, new versions of the data are written to disk, while leaving the previous versions stored. Thus, the amount of storage required for such systems grows as new versions of the data objects are generated. Accordingly, there is a need for increased efficiency of data object storage.

The various embodiments are directed towards methods and systems for the increased efficiency of object storage in SDDCs. The embodiments include the efficient storage of data objects, while enabling fault-tolerant uploads of multiple snapshots of the object. A current snapshot of the object encodes differences between the current version of the object and a previous version of the object. The current snapshot, as well as each previous snapshots of the data object may be efficiently recovered and/or reconstructed via the various embodiments. The metadata for an object may encode one or more mappings required for accessing the current version of the data and/or recovering a previous version of the data. More specifically, an object's metadata encodes difference-level mappings for each snapshot in compact self-balancing data trees. The metadata encoded in metadata may include mappings between various address spaces employed by the SDDC, as well as the address spaces employed by a data store that stores the data on physical medium (e.g., one or more traditional and/or solid state disk drives). Because the metadata is efficiently structured, the metadata for an object may be cached for quick lookups during data access and/or snapshot recovery. The various embodiments also provide low-latency recovery and/or system rollback in the event of any failure in an SDDC, as well as the graceful recovery when a system failure occurs during the uploading of data for each snapshot.

Figure 1B:
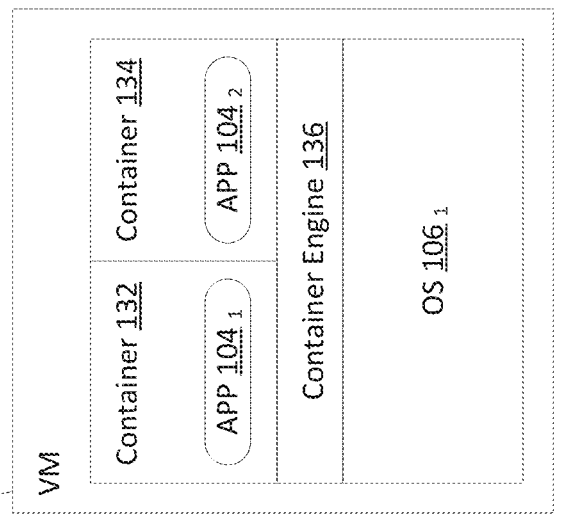
FIG. 1B is a block diagram illustrating a containerized application framework for implementing various components of a distributed-computing system, in accordance with some embodiments.
Figure 1A:
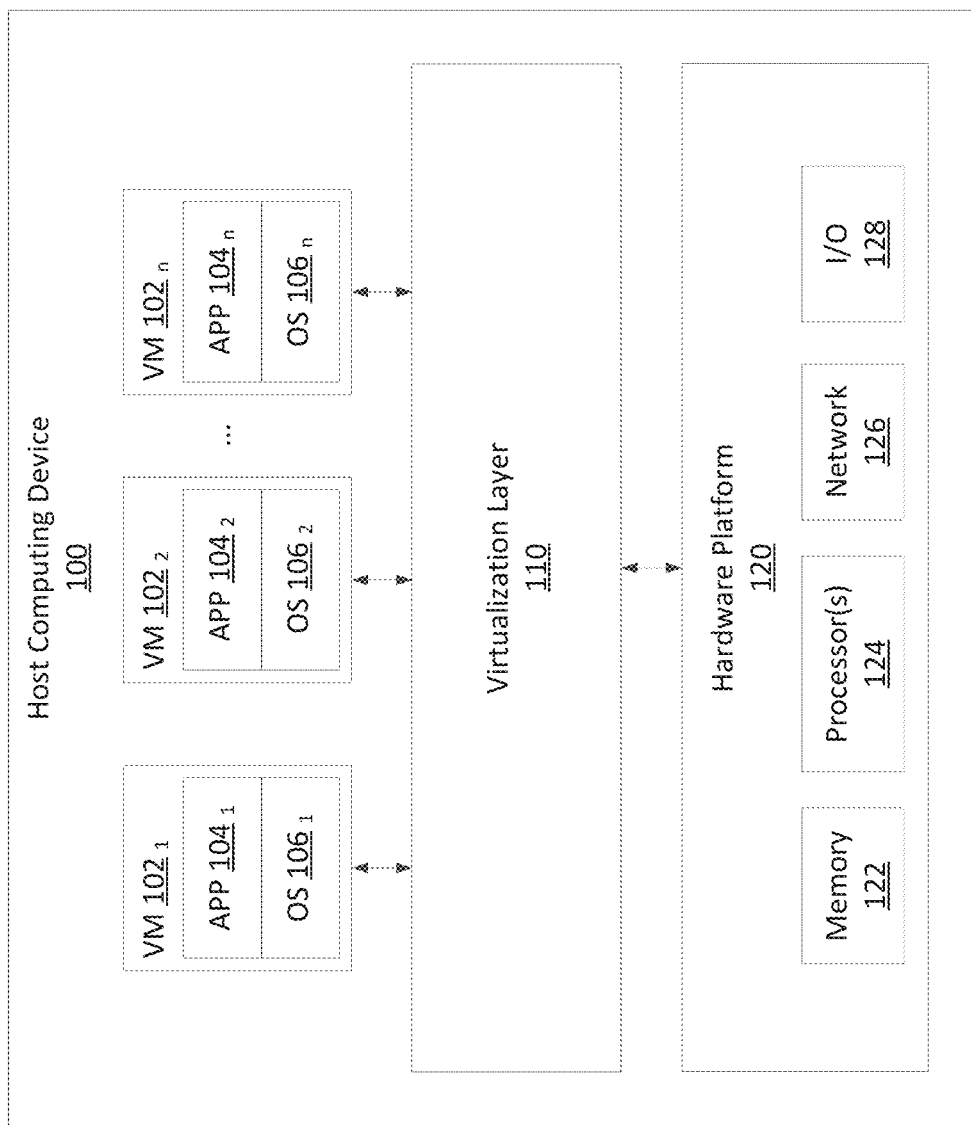
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1, virtual machines (VMs) $102_1$, $102_2 \ldots 120_n$ are instantiated on host computing device 100. In some embodiments, host computing device 100 implements one or more elements of a distributed-computing system (e.g., storage nodes of a vSAN 200 described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, NVMe devices, Persistent Memory, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
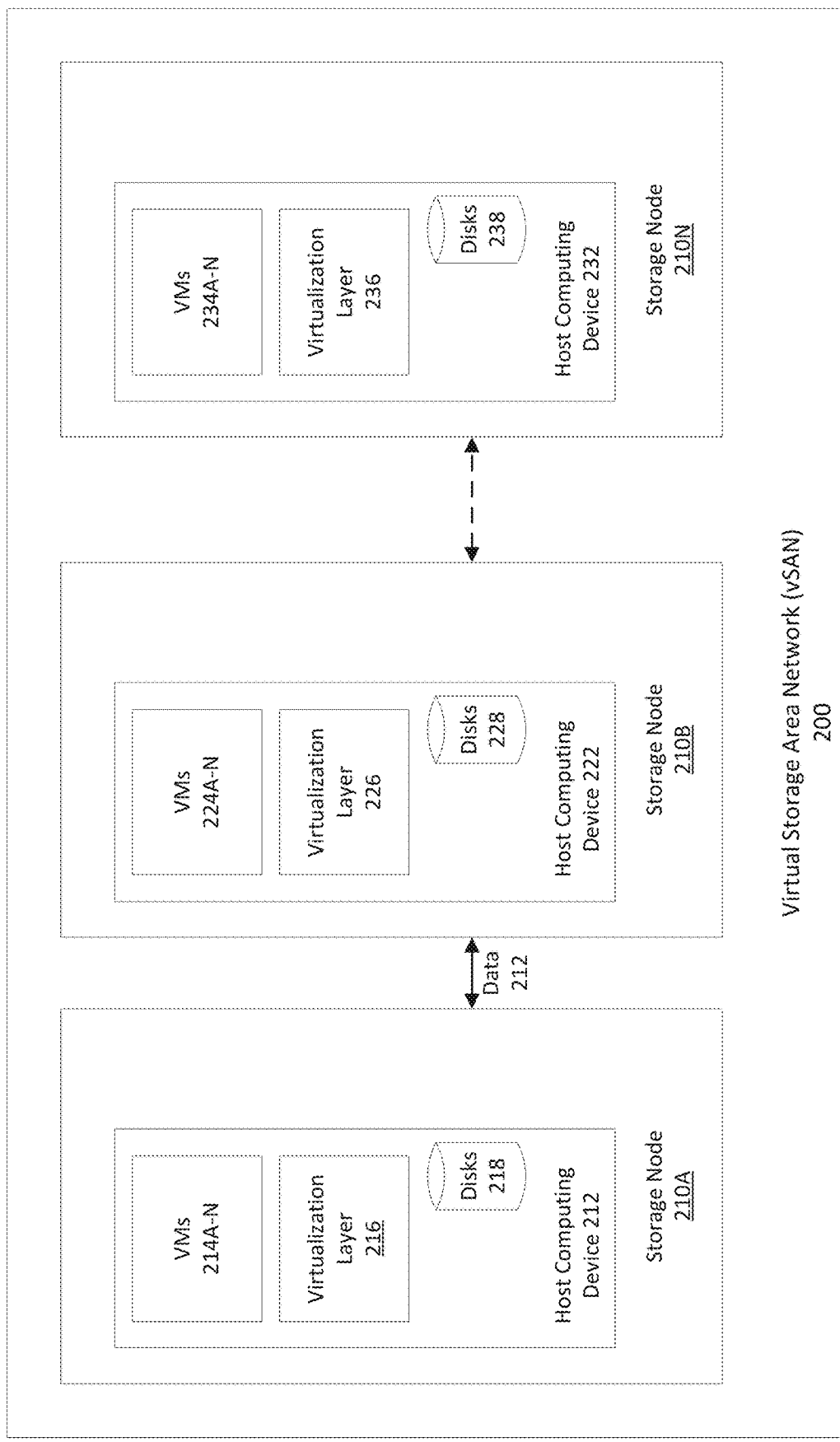
FIG. 2 is a block diagram illustrating a virtual storage area network (vSAN), in accordance with some embodiments.

FIG. 2 is a block diagram illustrating a virtual storage area network (vSAN) 200, in accordance with some embodiments. As described above, a vSAN is a logical partitioning of a physical storage area network. A vSAN divides and allocates a portion of or an entire physical storage area network into one or more logical storage area networks, thereby enabling the user to build a virtual storage pool. As illustrated in FIG. 2, vSAN 200 can include a cluster of storage nodes 210A-N, which can be an exemplary virtual storage pool. In some embodiments, each node of the cluster of storage nodes 210A-N can include a host computing device. FIG. 2 illustrates that storage node 210A includes a host computing device 212; storage node 210B includes a host computing device 222; and so forth. In some embodiments, the host computing devices (e.g., devices 212, 222, 232) can be implemented using host computing device 100 described above. For example, as shown in FIG. 2, similar to those described above, host computing device 212 operating in storage node 210A can include a virtualization layer 216 and one or more virtual machines 214A-N (collectively as VMs 214). In addition, host computing device 212 can also include one or more disks 218 (e.g., physical disks) or disk groups. In some embodiments, VM 214 can have access to one or more physical disks 218 or disk groups via virtualization layer 216 (e.g., a hypervisor). In the description of this application, a storage node is sometimes also referred to as a host computing device.

As illustrated in FIG. 2, data can be communicated among storage nodes 210A-N in vSAN 200. One or more storage nodes 210A-N can also be logically grouped or partitioned to form one or more virtual storage pools such as clusters of storage nodes. The grouping or partitioning of the storage nodes can be based on pre-configured data storage policies such as fault tolerance policies. For example, a fault tolerance policy (e.g., a redundant array of independent disks policy or a RAID policy) may require that multiple duplicates of a same data component be stored in different storage nodes (e.g., nodes 210A and 210B) such that data would not be lost because of a failure of one storage node containing one duplicate of the data component. Such a policy thus provides fault tolerance using data redundancy. In the above example, each duplicate of the entire data component can be stored in one storage node (e.g., node 210A or node 210B). As described in more detail below, in some embodiments, multiple subcomponents of a data component or duplicates thereof can be stored in multiple storage nodes using dynamic partitioning techniques, while still in compliance with the fault tolerance policy to provide data redundancy and fault tolerance. For example, a particular data component may have a size that is greater than the storage capacity of a single storage node (e.g., 256 Gb). Using the dynamic partitioning techniques, the data component can be divided to multiple smaller subcomponents and stored in multiple storage nodes. A data structure (e.g., a hash map) for the subcomponents is determined and maintained for efficient data resynchronization. It should be appreciated that multiple data components can be stored in a storage node. And data structures for the subcomponents of the multiple data components can also be determined and maintained for efficient data resynchronization.

Figure 3:
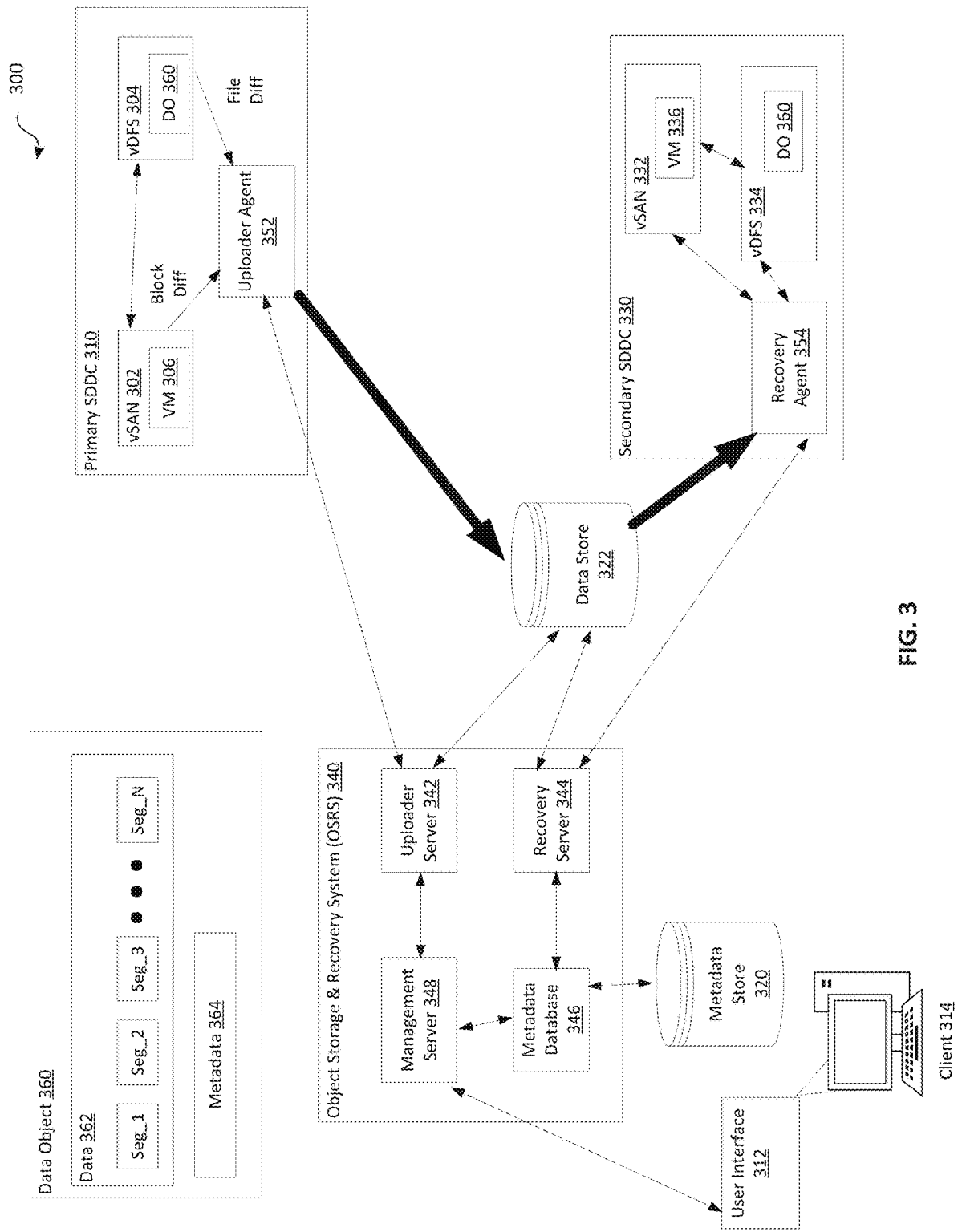
FIG. 3 is a block diagram illustrating an environment enabling distributed object storage and data recovery, in accordance with some embodiments.

FIG. 3 is a block diagram illustrating an environment 300 enabling distributed object storage and data recovery, in accordance with some embodiments. Environment 300 includes an object storage and recovery system (OSRS) 340. OSRS 340 enables a client 314 to store, retrieve, update, delete, or otherwise access one or more data objects, such as data object 360. Client 314 may employ a user interface (UI) 312 to perform such operations. UI 312 may interface with the management server 348 of OSRS 340. The management server 348 may generally manage the operations of OSRS 340. Via its various operations, OSRS 340 provides data storage, retrieval, updating, deletion, and access services (i.e., data center services) to client 314 for their data objects. OSRS 340 may employ a primary software designed data center (SDDC) 310 to at least partially manage the storage, retrieval, updating, deletion, and/or accessing of the data objects. Primary SDDC 310 may include one or more vSANs (e.g., vSAN 302). Various embodiments of a vSAN are discussed at least in conjunction with FIG. 2A. However, briefly here, one of the services primary SDDC 310 may provide to client 314 is one or more virtual machines (VMs). As such, vSAN 302 may implement one or more VMs (e.g., VM 306). Such a VM may provide computational and/or information processing services to client 314. Primary SDDC 310 may implement a virtual Distributed File System (vDFS) 304 to interact with the data objects and enable vSAN 302, e.g., vDFS 304 may provide at least portions of data object 360 to VM 306 for data analysis and/or data digestion services.

OSRS 340 may additionally enable the recovery of service in the event that the data center services provided by primary SDDC 310 are interrupted for any reason (e.g., a hardware malfunction and/or failure, a system state resulting in a "hang" condition, loss of power, or the like). In the event of a loss of service of from primary SDDC 310, the OSRS may switch to a secondary SDDC 330. The secondary SDDC 330 may provide data center services, which are equivalent to the services of primary SDDC 310, to client 314. As such, secondary SDDC 330 may implement one or more vSANs (e.g., vSAN 332) and/or a vDFS, e.g., vDFS 334. vSAN 332 may implement one or more VMs, e.g. VM 336. That is, in the event of a failure of primary SDDC 310, vSAN 332 may provide equivalent services as vSAN 302 and vDFS 334 may provide equivalent services as vDFS 304. In some embodiments, secondary SDDC 330 may be "spun up" in the event of an interruption and/or failure of primary SDDC 310. In other embodiments, at least portions of secondary SDDC 330 may be allocated and implemented prior to an interruption and/or failure of primary SDDC 310. As discussed throughout, when switching from primary SDDC 310 to secondary SDDC 330, OSRS 340 orchestrates the performance of a recovery process (or method), such that OSSR 340 may return providing services to client 314 (via secondary SDDC 330), with minimal interruption.

As also discussed throughout, "snapshots" of vSAN 302 and/or vDFS 304 may be "backed up", from time to time. These snapshots enable a "versioning" of vSAN 302 and/or vDFS 304, and the ability to "rollback" to any of the backed up versions of vSAN 302 and/or vDFS 304. That is, secondary SDDC 330 may be spun up to be in state that is an equivalent state to any of the backed up (or "snapshotted") states of primary SDDC 310. For instance, vSAN 332 (and thus VM 336) may begin operation in a state that is equivalent to the most recent snapshot of vSAN 302 (and thus VM 306), or in a state that is equivalent to any of the previous snapshots of vSAN 302 (and thus VM 306). Likewise, vDFS 334 (and thus data object 360) may begin operation in a state that is equivalent to the most recent snapshot of vDFS 304 (and thus data object 360), or in a state that is equivalent to any of the previous snapshots of vDFS 304 (and thus data object 360). For example, data object 360 may be "rolled back" to any of its previous versions that have been snapshotted.

Note that such a rollback does not require a failure of primary SDDC 310. For instance, a user of client 314 may accidently alter and/or delete data object 360 (or portions thereof). Several (e.g., 10) snapshots of vDFS 304 may be taken before the user notices their error. Data object 360 may be recovered to its state prior to the user's error, by rolling back data object 360 to its state encoded a snapshot taken prior to the user's error. VM 306 may be similarly restored, recovered, and/or rolled back via similar mechanisms. The recovery and/or roll back methods are discussed further below. In some embodiments, a rollback event, where the primary SDDC 310 has not failed, may trigger a transition from primary SDDC 310 to secondary SDDC 330, e.g., secondary SDDC 330 may be spun up to the desired previous state of primary SDDC 310. In other embodiments, a rollback event, where the primary SDDC 310 has not failed, may not trigger a transition from primary SDDC 310 to secondary SDDC 330, e.g., primary SDDC 310 may be rolled back to its desired previous state.

A current snapshot of vSAN 302 captures the differences between a current state of vSAN 302 and a previous state of vSAN 302, captured in a most recent (but previous) snapshot of vSAN 302. Likewise, a current snapshot of vDFS 304 captures the differences between a current state of vDFS 304 and a previous state of vDFS 304, captured in a most recent (but previous) snapshot of vDFS 304. A vSAN may be stored via block storage methods, and thus the differences captured in a vSAN snapshot may be at the block level. In contrast, data objects (e.g., files) managed by vDFS 304 may be stored via object storage methods. As such, the differences captured in a vDFS snapshot may be captured as file differences. In some embodiments, the differences captured in a vDFS snapshot may be segment-level differences. As discussed below, each object segment may be subdivided into a plurality of data chunks ("chunks"). In such embodiments, the differences captured in a vDFS snapshot may be chunk-level differences.

Snapshots of primary SDDC 310 may be taken at scheduled intervals (e.g., periodically and/or aperiodic intervals), from time to time, and/or via a triggering event. For example, taking a snapshot of vDFS 304 may be triggered via any data write operation (e.g., storing a new data object, updating a pre-existing data object, deleting a pre-existing data object, and the like). Likewise, various events (e.g., creating a new VM, rebooting a pre-existing VM, terminating a pre-existing VM, deleting a pre-existing VM, and the like) may trigger taking a snapshot of vSAN 302. In some embodiments, snapshots of each of vSAN 302 and vDFS 304 may be taken synchronously. In other embodiments, snapshots of each of vSAN 302 and vDFS 304 may be taken asynchronously.

Data object 360 includes data 362 and metadata 364. Data 362 includes the data that the user may care about and is encoded by object 360, whereas metadata 364 includes information regarding data 362 (e.g., "data about data"). In the various embodiments, and in order to provide contrast from metadata, the data of a data object may be referred to as "object data." Data object 360 may be referred to as a "file". However, the term file is not limiting, and a data object may include file, a portion of a file, a set of multiple files, or any set or collection of data (e.g., an object that includes data). Thus, data object 360 (or alternatively file 360) may include one or more files, partial files, or any other collection of data. Data 362 may be subdivided into a set of N objects segments (e.g., seg_1, seg_2, seg_3, . . . , seg_N), where N is any positive integer. In some embodiments, the size of an object segment may be predetermined and/or configured by client 314. In at least one embodiment, the size of the segments may be fixed at a segment size (SS), such that each segment has at least approximately SS of data (except for Seg_N, which may be smaller than Seg_N depending on the size of data 362). In at least one embodiment, SS=4 MB (e.g., each segment holds 4 MB of data 362).

As also discussed below, the data may be further subdivided into a plurality of data chunks. Each segment may include multiple data chunks (or simply chunks). The size of the data chunks may be variable and be based on a structure, arrangement, organization, and/or composition of the data itself. That is, data chunks of the same object may have difference sizes. The size of the data chunks may be anything larger than a logical block (discussed below) and smaller than the size of data segments. In various embodiments, a chunking method or algorithm is employed to chunk the data. The chunking algorithm may identify "natural breakpoints" in the data to determine the block addresses of the start point and end point for each of the chunks. A breakpoint for a chunk may be identified via a "signature" within a fingerprint of the data. By identifying natural breakpoints, the chunking algorithm may be resistant to shifts in the objects data. Thus, when re-chunking edited data, the boundaries of a chunk are likely to be invariant (with respect to which data the chunk includes) in the re-chunking, even though additional or less data may be included in the new chunk.

The chunking method may include employing a sliding window and a fingerprinting algorithm. The implemented fingerprinting algorithm may include a hash function, such as but not limited to a Rabin fingerprinting scheme. In some embodiments, the size of the chunks may be variable and may vary from 1 kB to 1 MB. Thus, a single data segment may include numerous data chunks. In some embodiments, the data is chunked such that each chunk is approximately 80 kB.

In some embodiments, metadata 364 may be organized into data blocks and is thus stored via block storage. Due to the object nature of data object 360, its data (e.g., data 362) may be stored via object storage. Metadata 364 may be stored, via block storage, in a metadata store 320. Data 362 may be stored, via object storage, in a data store 322. The data store 322 may employ a log-structured file system (LFS) for storing the data. In non-limiting embodiments, metadata store 320 may be provided by one or more block storage service providers, such as but not limited to Amazon Elastic Block Store (EBS). In non-limiting embodiments, data store 322 may be provided by one or more object storage service providers, such as but not limited to Amazon Simple Storage Service (S3). These embodiments, are non-limiting, and other block and/or object storage service providers may be employed.

In some embodiments, data object of primary SDDC 310 may identified by a unique object identifier (e.g., file_ID and file_ID=1 for data object 360). Each snapshot of a file object may be identified by a unique snapshot identifier (e.g., snapshot_ID). Because data may be written via a log-structured file system (LFS), one feature that is inherent to many object storage methods is that, once written to the data store 322, the data of an object may not be overwritten. That is, to update and/or change the data of an object, a new "version" of the object must be written to the data store, where at least new "versions" of the affected data chunks may be written to the data store. For instance, data object 360 may be a source code file, where the first line includes a comment describing the code's functionality. The first snapshot of data object 360 (e.g., file_ID=1) may be identified as version 1 (snapshot_ID=1) of data object 360. The data 362 of the first version of data object 360 may include the segments: (seg_1, seg_2, seg_3, . . . , seg_N). The first line of the source code may be included in a particular chunk of a particular segment (e.g., the $4^{th}$ chunk of a $3^{rd}$ segment of the object).

If a user edits the comment on line 1 of the source code by one or more characters, and then re-saves the source code file, the entire particular chunk of the particular segment that includes the first line may be required to be-resaved as a new chunk, which may be included in a different segment. The new chunk in the different segment includes line 1 as edited by the user, along with other data that may have been included in the particular chunk of the particular segment (e.g., the old chunk). As noted above, saving a data object may trigger a taking (and saving) of a new snapshot of the data object, e.g., a current snapshot where snapshot_ID=2. Snapshots, as used herein, maybe difference-based snapshots. That is, the current snapshot (e.g., snapshot_ID=2) of data object 360 may capture the (chunk-level) differences between the updated file and the most recent previous snapshot (e.g., snapshot_ID=1). In this way, a data object's state may be recovered via a sequential traversal "backwards" through the snapshots. For instance, data object's 360 state associated with snapshot_ID=M, may be recovered by starting with snapshot_ID=M, then traversing backwards to snapshot_ID=(M−1), and then sequentially backwards to snapshot_ID=1. In some embodiments, the snapshot corresponding to snapshot_ID=1 may be referred to as the base snapshot, while the subsequent snapshots are referred to as delta snapshots. Thus, sequential snapshots may be notated as: base, delta_1, delta_2, delta_3, . . . , delta_M.

Because the only difference between the previous snapshot (snapshot_ID=1) and the new snapshot (snapshot_ID=2) of the data object 360 is the affected (and re-written) segment (e.g., replacing old seg_3 with new seg_N+1), data 362 for the new snapshot (snapshot_ID=2) will include the new chunk and disregard the older version of the chunk (e.g., the old chunk). As noted above, since consecutive snapshots are based on differences, snapshot_ID=2 only needs to indicate that old chunk has been substituted with the new chunk. As noted above, data is stored via an LFS. When the old chunk is replaced by the new chunk for the new version of data object 360, the new chunk may be written sequentially to a circular buffer of the LFS, which may be in a different segment. Thus, the old chunk is not overwritten or erased, even though it is not included in the updated version of data object 360. The old chunk may is still accessible by primary SDDC 310. In the event that the user would like to roll back the current version (e.g., snapshot_ID=2) of data object 360 to its initial version (e.g., snapshot_ID=1), the initial version may be recovered (or re-constructed) by substituting the still available old chunk, rather than including the new chunk.

As will be discussed in more detail below, metadata of a data object (e.g., metadata 364 of data object 360) may include metadata that maps logical addresses to a segment addresses of the data object. That is, metadata maps a logical address space to a segment address space for the data objects accessible by primary SDDC 310. The notation of L_X, where X is a logical address in the logical address space, may be employed to indicate a logical address of a data file. The notation of Seg_Y, where Y is a segment address in the segment address space, may be employed to indicate the segment address of a data file. In various embodiments, a logical address may be an address for a logical block. Thus, each logical block of data may be addressed via a logical block address (lba). The size of a logical block may be of any value. However, in some embodiments, the size of a logical block is 1 byte. Thus, in the example where a segment includes 4 MB of data, the data of the segment may be addressable at the byte level. There would be 4 MB of logical addresses (e.g., lba) to address each block in the segment.

As discussed more fully below, mappings between a first and a second address space may be represented by key-value pairs, where the key indicates a reference to the first address space and the value corresponding to the key indicates a reference to the second address space. Such key-value pairs may be represented via the n-tuple format: <key>→<value>. In some embodiments, a mapping between a logical address and a segment address may be represented as: <lba>→<seg_ID, block_offset>, where lba indicates the logical block address (L_1), seg_ID indicates a segment (e.g., seg_1), and offset indicates a block offset within the identified segment. That is, a segment address may include both an identifier for the segment and a segment block offset to identify a particular physical block within the segment. In some embodiments, the size of the logical and physical blocks are equivalent (e.g., 1 byte). For example, <L_1>→<seg_1, 1> indicates that the logical address L_1 is mapped to the first block of seg_1, whereas <L_2>→<seg_1, 2> indicates that the logical address L_2 is mapped to the second block of seg_1. Note, in embodiments, at least portions of such mappings may not be as contiguous as this simple example exhibits. That is, the correspondences between the logical address space for a data object and the segment address space (e.g., segment_ID and block_offset) for the data object may be more fragmented than this example suggests. For example, a mapping may be such that <L_3>→<seg_512, 415> indicates that the logical address is mapped to the $415^{th}$ block of seg_512.

As also discussed below, each data chunk may be individually addressable, and the data chunk addresses act as a layer of "misdirection" between the logical addresses and the segment addresses. That is, a logical address (for a logical block) is mapped to a chunk address, and the chunk address is mapped to a segment address. Thus, the mapping between a logical address space and a segment address space is mediated by a "virtual address space" (e.g., the chunk address space) situated in between the logical and segment address spaces. A chunk address may be indicated as chunk_ID.

As a data object is updated and corresponding snapshots are taken, the mapping between the logical address and the segment addresses may be updated to encode the mapping of the newest snapshot, while retaining the mappings of the previous snapshots. In the above example, the logical address corresponding to the first line of code (e.g., L_1) may not vary between the two snapshots, but the corresponding segment address is different in the two snapshots. The segment address for snapshot_ID=1 is mapped to the old chunk, while the segment address for snapshot_ID=2 is mapped to the new chunk. Thus, such mappings between the logical address space and the segment address space (intermediated by the chunk address space) are dynamic and updated as new objects are created and as pre-existing objects are modified and/or deleted. The mappings between addresses spaces may be encoded in key-value pairs as discussed throughout. The key-value pairs may be included in the metadata for an object. In some embodiments, the key-value pairs are stored in a key-value store. The key-value store may be a distributed transactional key-value database, such as but not limited to TiKV and/or TiDB. The key-value store may be included in metadata database 346, as discussed below.

In such key-value pair mapping between a first address space and a second address space, the key may correspond to one or more indications (or identifiers) within the first address space (e.g., an address of the first address space). The paired value may correspond to one or more indications (or identifiers) within the second address space (e.g., an address of the second address space). Such key-value pairings (and thus address mappings) may represented via an n-tuple representation: <key>→<value>. Such notation is used throughout, where the component to the left of the arrow character (→) represents a key and the component to the right of the arrow character represents the paired value. Thus, mapping a first address of a first address space (e.g., address_1) to a second address of a second address space (e.g., address_2) may be represented by the n-tuple representation: <address_1>→<address_2>. The keys and corresponding values (e.g., mappings between address spaces) may be included in an object's metadata and arranged in a self-balancing data tree (B-tree), such as but not limited to a copy-on-write (COW) B-tree. In other embodiments, a Log-Structured Merging Tree (LSM Tree) may be employed. Because the tree is self-balancing, traversing a B-tree is a relatively fast process. Storing the keys and paired values in a B-tree allows for fast lookup access. In order to further increase a lookup speed for a mapping, at least a portion of an object's metadata B-tree may be cached.

In some embodiments, a SDDC may primarily address a data object via its logical addresses, whereas a data store (data store 322) may primarily address the data object via its segment addresses. Segment addresses may be referred to as a physical address. In some embodiments, a logical address may correspond to one or more logical and/or virtual layers associated with a SDDC, while the corresponding segment address may correspond to a lower "physical" layer of a data store. The OSRS 340 may employ an object's metadata to provide mapping services between an object's logical address and a file system's segment space (e.g., the file system of object store). In at least one embodiment, OSRS 340 may transmit to and/or receive logical addresses from primary SDDC 310 and receive and/or transmit corresponding segment addresses to data store 322, via an object's metadata.

At least due to the finite nature of the circular log of the LFS storing the snapshots of data (and of an LFS for storing snapshots of a vSAN) or due to the need to save cost by limiting the total storage space used, the number storable snapshots (for each of vSAN 302 and vDFS 304) may be finite. For example, the finite number of snapshots may be limited by the circular log allocated for client 314 and/or the number and size of data objects they are using. In some embodiments, the number of possible snapshots for vSAN 302 and/or vDFS 304 may be limited to a fixed number (e.g., 100). That is, there may be a fixed window (a data volume or snapshot number window) of snapshots available to client 314. The snapshots may be rotated through the available window. Thus, a snapshot extending past this fixed window will be rolled forward to the beginning of the fixed window. In the above example where the fixed window is limited to 100 snapshots, when snapshot_ID=101 is taken (or when the end of the circular log reached), the snapshot data for snapshot_ID=101 may be written back at the beginning of the fixed window, e.g., snapshot_ID=101 is rolled forward to the beginning of the fixed window. Thus, one or more older snapshots may be overwritten. When this occurs, older snapshots may "expire" and become non-recoverable. In various embodiments, a non-linear expiration schedule may be employed. In some embodiments, a snapshot that has expired may not be the oldest snapshot. For example, a snapshot schedule may include keeping 24 hourly snapshots for the last day, then 30 daily snapshots for the last month, 12 monthly snapshots for the last year, and 7 annual snapshots. When a new snapshot is created, the $25^{th}$ old hourly snapshot will be deleted, although it is newer than other daily, monthly, and annual snapshots.

The expiration of snapshots (and re-writing of data segments) may require frequent moving of data in a lower physical layer (e.g., in the segment address space). Data that was written for an expired snapshot, but has not be re-written or updated since the expired snapshot was taken, may need to be routinely moved on the physical storage medium, and thus updates to the metadata may be required. In the above example, a particular chunk (e.g., chunk_ID=100) may have been written during the writing of the first snapshot (snapshot_ID=1) of data object 360. The user may frequently update data object 360, but not edit the data stored in chunk_ID=100. When snapshot_ID=101 is written, because of the "rolling forward" aspect of the LFS's circular log, the data stored in chunk_ID=100 may be overwritten. In order to avoid losing the data of chunk_ID=100 (and thus all the snapshots of data object 360, which include chunk_ID=100 as originally written), the data of chunk_ID=100 must be re-written at the physical layer to avoid the snapshot_ID=101 data overwriting chunk_ID=100. For instance, the data encoded in chunk_ID=100 may be moved to an area on the physical medium and associated with a snapshot that is not yet expired (e.g., snapshot_ID=2). As will be discussed below, the metadata may need updating to account for the "moving" of data occurring at the physical layer. A "garbage collection" process may be generally responsible for re-allocating expired segments, once the "live" data has been moved.

After the data is "chunked" (e.g., each segment is subdivided into a plurality of data chunks) each data segment may include a plurality of data chunks. As discussed in conjunction with at least FIGS. 4C-4E, each data chunk of each segment may be individually addressable via a corresponding chunk address. The metadata for a data object may provide a mapping between a logical address space and a chunk address space, as well as a mapping between the chunk address space and the segment address space, for a data object. The metadata may additionally provide content aware storage (CAS) services for a data object. That is, if the data of a chunk is known, its logical address, its chunk address, and its segment address may be determined via a CAS map (e.g., a hash mapping) included in the object's metadata.

To enable such snapshot and recovery operations, OSRS 340 may include an uploader server 342, a recovery server 344, and a metadata database 346. As shown in FIG. 3, the primary SDDC 310 may include a corresponding uploader agent 352. Likewise, the secondary SDDC 330 may include a corresponding recovery agent 354. For snapshots of vSAN 302, block-level differences (with respect to the previous snapshot) are provided from vSAN 302 to uploader agent 352. For snapshots of vDFS 304, file-level (or data object-level) differences (with respect to the previous snapshot) are provided to the uploader agent 352. As discussed below, the file-level differences of vDFS 304 may be chunk-level differences. The "fat" arrow from uploader agent 352 to data store 322 shows the data (e.g., difference data) being provided to the data store 322 for storage. The uploader agent 352 sends a control signal to uploader server 342, informing the OSRS 340 of the uploading of the snapshot to the object store 322. The uploader server 342 may sent a control signal to the data store 322. The control signal provided to the data store 322 may inform the data store with regards to how to store the block and file differences (e.g., new data) received from the primary SDDC 310. Such information may include one or more identifiers for the new data (e.g., which objects or vSANs the new data correspond to), segment address, and the like.

For a recovery and/or transition to secondary SDDC 330, the recovery agent 354 may get information from the recovery server 344 (e.g., which data needs to be downloaded, associated metadata, or the like). The recovery server 344 may provide recovery information to the data store 322, e.g., which data needs to be downloaded to the secondary SDDC 330. The "fat" arrow from the data store 322 to the recovery agent 354 shows the recovery data being provided to the secondary SDDC 330. The management server 348 may provide some management services for the uploader and recovery servers 342/344. The metadata of an object may be provided to the metadata store 320 via the metadata database 346. The metadata database 346 may include a fast cache for caching metadata.

Note that prior to data being provided to the data store 322, via the uploader agent 352, the data may be compressed and/or then encrypted. Encryption of the data provides data privacy measures, while compression decreases the amount of required storage space within the data store 322. Each of the primary SDDC 310 and the secondary SDDC 330 may be enabled with encryption/decryption services, as well as compression/decompression services. Similar to the data, the metadata may be compressed and/or then encrypted prior to being stored in the metadata store 320.

FIGS. 4A-4E are directed towards the address spaces associated with a data object (e.g., a data file), and the encodings of the mappings between the address spaces employed to capture snapshots of a data object. It should be understood that such schemas may be adopted for address spaces and snapshots of vSAN. FIG. 4A is a block diagram illustrating an object data structure 400 for a data object, in accordance with some embodiments. As discussed in conjunction with at least data object 360 of FIG. 3, a data object may include both data and metadata. The data and metadata may be envisioned within a data structure (e.g., object data structure 400) that includes a metadata layer 410 and a data layer 420. The data may be envisioned to reside in the data layer 420, as being subdivide into a plurality of segments. Each data segment may be addressed via segment addresses of an segment address space: Seg_1, Seg_2, Seg_3, . . . , Seg_N. For simplicity, the plurality of data chunks associated with each of the data segments are not shown in FIG. 4A. See FIG. 4B for an illustration of "chunked" data.

As noted above, metadata may provide a map between the logical address space (e.g., an address space employed a VM when processing data) and the segment address space (e.g., an address space that includes segment addresses provided to a data store for accessing the data). The metadata may be envisioned to reside in the metadata layer 410. As noted above, because data for snapshots may be "rolled forward," the segment address where a particular data is stored may change over time. When data is moved (e.g., for expired chunks, chunk deletion, and the like), the segment address for the moved data may need to be updated. Thus, the mapping between a logical address and the corresponding segment address of the moved data may need to be updated. In order to decouple data movements from deletion of data (and thus diminishing the need for frequent updates to the logical address space to segment address space map), the metadata layer 410 may include two sub-layers: the logical layer 412 and content addressable storage (CAS) layer 414. As shown below, the CAS layer 414 provides a level of misdirection between the logical and segment mapping that decreases the need to update the logical to segment address mapping, when data is moved around (via garbage collection processes) at the data layer 420 (e.g., a physical layer). The data in data layer 420 may be arranged via a LFS file system. The metadata of the metadata layer 410 may include a plurality of key-value pairs that store the mappings between the address spaces. The key-value pairs may be stored in a self-balancing data tree (e.g., a B-Tree). A vDFS of a SDDC may be enabled to implement the LFS for the data, as well cache (for fast lookup) at least a portion of the metadata.

The logical layer 412 is associated with the logical addresses for one or more data objects, such as but not limited to virtual machine disk files (VMDKs): e.g., VMDK_1 and VMDK_2. A VMDK may be referred to as a "file" or data object accessible via a SDDC. The CAS layer 414 is associated with a "virtual address" corresponding to a logical address. As discussed below, the CAS layer 414 includes an address space that provides a "misdirection" between the logical address space of logical layer 412 and the segment address space of data layer 420. The "virtual address" address is then mapped to the corresponding segment address. Via a hash mapping, the virtual address may be a content aware address. That is, an address (logical, virtual, or segment) may be identified via a signature of the data. As data is moved around the segment address space, but the content itself is not changed (e.g., for a garbage collection process), its signature is not altered. The signature of the content may be a hash value of the content. As noted above, the data may be "chunked" into smaller units than segments, where each chunk may be addressable via a logical address. The hashing of the data (e.g., to provide CAS properties) may be performed at the chunk-level.

FIG. 4B is a block diagram illustrating a chunked data 480, in accordance with some embodiments. Data 480 includes two segments of data (e.g., Seg_1 and Seg_2). Each data segment may include multiple chunks of data. In the non-limiting example of FIG. 4B, Seg_1 includes two chunks of data (e.g., referred to as chunk_10 and chunk_11) and Seg_2 includes two chunks of data (e.g., referred to as chunk_12 and chunk_14). In other embodiments, data 480 may include more than two segments, and each segment may include more than two chunks.

In various embodiments, a chunking method or algorithm is employed to chunk the data 480. The chunking algorithm may identify "natural breakpoints" in the data 480 to determine the block addresses of the start point and end point for each of the chunks. A breakpoint for a chunk may be identified via a "signature" within a fingerprint of the data. By identifying natural breakpoints, the chunking algorithm may be resistant to shifts in the objects data. Thus, when re-chunking edited data 480, the boundaries of a chunk are likely to be invariant (with respect to which data the chunk includes) in the re-chunking, even though additional or less data may be included in the new chunk. The chunking method may include employing a sliding window and a fingerprinting algorithm. The implemented fingerprinting algorithm may include a hash function, such as but not limited to a Rabin fingerprinting scheme. In some embodiments, the size of the chunks may be variable and may vary from 1 kB to 1 MB. Thus, a single data segment may include numerous data chunks. In some embodiments, the data is chunked such that each chunk is approximately 80 kB.

FIG. 4C is a block diagram illustrating content aware addressing of data chunks, in accordance with some embodiments. Shown in FIG. 4C are three address spaces (e.g., logical address space 450, hash value space 460, and segment address space 470) and a mapping between the address spaces 422. In this non-limiting embodiment, the hashing of the data is performed at the chunk-level, where the size of each chunk corresponds to a logical block. In various embodiments, the logical layer 412 of FIG. 4A may provide the mapping from logical address space 450 and hash value space 460. The CAS layer 414 may provide the mapping from the hash value space 460 and the segment address space 470. The hash value space 460 may be a "virtual" address space. As shown in FIG. 4C, the hash value space 460 may provide a misdirection layer between the logical address space 450 and the segment address space 470. Thus, the hash value space 460 decouples the movement of chunks within the segment address space 470 (e.g., a physical layer) from the deletion of chunks.

Referring back to FIG. 4B, a hash value for the data in each chunk may be generated and logical addresses may correspond to the chunks. That is, in this non-limiting embodiment, the chunk size and the logical block size are providing a one-to-one mapping between logical blocks and chunks. Furthermore, the segment size in this non-limiting embodiment is 2 logical blocks. Other embodiments are not so limited, and chunk sizes may be significantly greater than one logical block, such that each chunk may include multiple logical blocks. Additionally, the segment size may be significantly greater than two logical blocks. In other non-limiting embodiments, a segment size may be approximately 4 MB, the chunk sizes may vary from 1 kB to 1 MB, and the logical block size may be 1 byte. In some embodiments, the data is chunked such that each chunk is approximately 80 kB.

In the non-limiting embodiment of FIGS. 4B-4E, the one-to-one mapping includes L_1→chunk_10, L_2→chunk_11, L_3→chunk_12, and L_4→chunk_13. The hash value for the data of chunk_10 may be "BA36", the hash value for the data of chunk_11 may be "78E5", the hash value for the data of chunk_12 may be "FD02" and the hash value for the data of chunk_13 may be "24F9". The arrows between the logical address space 450 and hash value space 460 show the mapping between the logical layer 412 and the CAS layer 414 of the metadata layer 410 of FIG. 4A. Likewise, the arrows between the hash value space 460 and the segment address space 470 show mapping between the CAS layer 414 and the data layer 420 of FIG. 4A. Note that as long as the data in the chunks is unique and the hash function is of sufficient quality, the hash value uniquely identifies the chunk. Thus, the hash value may be a unique identifier for a data chunk (e.g., when deduplication processes are employed), as well as a unique identifier for the data of a chunk. Various deduplication processes may ensure that redundant data is not stored in multiple segments. Thus, the hash value may serve as a chunk identifier. Because the hash value is dependent on the data included in the chunk, and is unique to that data (e.g., when a hash function of sufficient quality is employed), the hash value may be a signature of the chunk and/or the data included in the chunk.

The metadata may encode mappings between various address spaces (e.g., a mapping between a logical address space and virtual address space, a mapping between the virtual address space and a segment address space, and the like) via key-value pairs. The key-value pairs may be encoded in a data tree, such as a B-Tree or a LSM Tree. In some embodiments, a copy-on-write (COW) B-tree is employed to store the key-value pairs. In such a B-Tree encoding of the mappings, the keys may be represented by the non-leaf nodes of a B-Tree, while the corresponding values may be represented as the leaf nodes. In other embodiments, a Log-Structured Merging Tree (LSM Tree) may be employed to store the key-value pairs. The keys and corresponding paired values may be represented as an n-tuple.

The notation for the n-tuple representation of key-value pairs is now reviewed. Each data object may have a unique identifier (e.g., Object_ID). Each snapshot of a data object has a unique identifier (snapshot_ID). Because each logical address addresses a block of data, a logical address may be referred to as a logical block address (LBA). Thus, a specific logical address for a specific data chunk of a specific snapshot of a specific data object (e.g., a file) may be represented as the n-tuple <object_ID, snapshot_ID, lba>. The mapping of the specific logical address (of the logical address space 450) to a specific hash value (e.g., <hash_value>) of the hash value space 460 (e.g., a virtual address space) may be represented the n-tuple mapping: <object_ID, snapshot_ID, lba>→<hash_value>. Note that both the <key> and the <value> may be an n-tuple with more than one component. The key <object_ID, snapshot_ID, lba> includes 3 components: object_ID, snapshot_ID, and lba.

The ordering of the components of a key and/or paired values may be significant, at least because of the placement or insertion of the key-value pair in a B-Tree. In the above example, the object_ID is the $1^{st}$-order component (or most significant component), the snapshot_ID is the $2^{nd}$-order components, and lba is the $3^{rd}$-order component (or least significant component). When inserted into a B-tree, the keys are sorted via the ordering of the components in the n-tuple representation. The most significant component being the primary component for the sorting and the least significant component being the least-significant component for the sorting. Thus, keys with a common $1^{st}$-order component are grouped together first. Keys with a common $1^{st}$-order component and a common $2^{nd}$-order component are grouped together (within the initial grouping of the common 1-st order component), and so on until the least significant component. Thus, all keys with a common $1^{st}$-order component may grouped in a similar region (e.g., all within the same sub-tree) of the B-Tree. Keys with a common $2^{nd}$-order component (but dissimilar $1^{st}$-order components) may be located in disparate regions (e.g., separate sub-trees) of the B-tree.

Mappings between vector spaces (and/or mappings of keys to corresponding values) may be represented via an n-tuple representaion. As used throughout, an n-tuple to the left of an arrow (→) character (e.g., <object_ID, snapshot_ID, lba>) may indicate a key and the n-tuple to the right of the arrow character (e.g., <hash_value>) indicates the value corresponding to the key. Note that the specific hash value is the hash value for the data stored in the specific data chunk. Using this notation, the mapping between the logical address space 450 and the hash value space 460 may be represented by the following 4 n-tuples: <object_ID, snapshot_ID, L_1>→<"BA36">, <object_ID, snapshot_ID, L_2>→<"78E5">, <object_ID, snapshot_ID, L_3>→<"FD02">, and <object_ID, snapshot_ID, L_4>, <"B24F9">. The mapping between the logical address space 450 and the hash value space 460 may be referred to as a logical map. Thus, the logical map of FIG. 4C requires 4 n-tuples. Note that in this non-limiting embodiment, because the logical block size is equivalent to the chunk size, the hashing of the data may be considered to be performed at either the logical block-level or the chunk-level. In other embodiments, the hashing is performed at the chunk level, such that multiple logical addresses may correspond to a single hash value.

The n-tuple <seg_ID> may represent a segment address of the segment address space 470. For garbage collection purposes, a reference counting process may be used to track the number of references that point to <seg_ID>. In these embodiments, the n-tuple <seg_ID, block_offset, ref_count> may be employed to represent the segment address (e.g., the segment identifier and the logical block offset), as well as the corresponding reference counter, e.g., ref_count. The format for the mapping of the hash value space 460 to the segment address space 470 may be represented by the n-tuple format: <hash_value>→<seg_ID, block_offset, ref_count>, where <hash_value> is the key and <seg_ID, block_offset, ref_count> is the corresponding value. Using this notation, the mapping between the hash value space 460 and segment address space 470 may be represented by the following 4 n-tuples: <"24F9">→<seg_2, 1, ref_count_2>, <"78E5">→<seg_1, 2, ref_count_1>, <"BA36">→<seg_1, 1, ref_count_1>, and <"FD02">→<seg_2, 2, ref_count_2>. The mapping between the hash value space 460 and the segment address space 470 may be referred to as a hash map. Thus, the hash map of FIG. 4C requires 4 n-tuples.

The hash values of the chunks provide a unique identifier for the content stored in a chunk. Thus, the hash values provide the content aware property for the CAS layer 414 of FIG. 4A. Because the segment addresses may be addressed via content aware addresses, the hash values may be employed for deduplication processes, e.g., removing chunks that include identical data. Such deduplication processes ensure that multiple chunks storing the same data are not stored by a data store, reducing the total volume required by a client.

In some embodiments, the metadata of a data object may be cached for quick reference (e.g., to speed up a deduplication process). In some embodiments, one or more vSANs in a SDDC may cache the metadata for one or more data objects. As noted above, metadata database 346 of the OSRS 340 may cache an object's metadata. Employing a hash function of sufficient quality generates the appearance of pseudo-random hash values. Therefore, the hash values may lack "locality" in a hash value space. This non locality is shown via the logical mapping of FIG. 4C. Furthermore, imposing a natural ordering on the hash values may be difficult. In order to lookup information included in a cache, it may be preferred to have sequential values and/or values of sufficient locality. Thus, it may be difficult to employ cached hash values.

To overcome this hash value caching issue, some embodiments employ another unique identifier for each chunk. That is, a unique "chunk_ID" may be assigned to each chunk. Furthermore, any set of chunk_IDs may have a natural ordering. The chunk_IDs may be generated sequentially, in view of their natural ordering. Thus, such chunk_IDs have good locality and may be cached for quick reference (e.g., to use in a deduplication process). As used herein, the following notation may refer to a chunk_ID. C_X, where X is a positive integer. Due to the sequential nature of generating chunk_IDs, when two new chunks are received for storage, the first new chunk may be assigned a chunk_ID of C_N, and the second new chunk may be assigned a chunk_ID of C_N+1, where the previous chunk was assigned a chunk_ID of C_N−1. Because it is unique, a chunk_ID may serve as a chunk address in a chunk address space.

FIG. 4D is a block diagram illustrating a mapping 430 between a logical address space 450, a chunk address space 490, and a segment address space 470, in accordance with some embodiments. In such embodiments, each chunk is assigned a logical address and a chunk address (e.g., a chunk_ID). Similar to the hash value space 460 of FIG. 4C, the chunk_ID provides a misdirection layer between the logical address space 450 and the segment address space 470. Thus, the chunk address space 490 may be a virtual address space that decouples the movement of chunks from the deletion of chunks, as previously discussed. Note the "locality" (or sequential/ordered nature) of the chunk_IDs in the chunk address space 490. Thus, in contrast to the hash values of FIG. 4C, the chunk_IDs may be cached for quick reference. The logical address space 450 and segment address space 470 are equivalent to the corresponding address spaces in FIG. 4C. However, the "misdirection layer" (e.g., chunk address space 490) includes four chunk addressed (e.g., chunk_IDs): C_10, C_11, C12, and C_13.

In contrast to FIG. 4C, the logical address space 450 is mapped into the virtual address space (e.g., chunk address space 490) in a sequential, contiguous, and localized manner. Due to this "locality" of the chunk address space 490 and the "locality" of the logical address space 450, a more compact n-tuple notation may be employed for logical mappings that map logical addresses to chunk_IDs. The logical map of FIG. 4D requires a single n-tuple of the form <lba>→<chunk_ID, num_chunks>. In this notation, <lba> represents a logical address as a key, and <chunk_ID, num_chunks> as the corresponding value. The num_chunks value indicates the number of contiguous logical addresses mapped to corresponding contiguous chunk addresses. As shown in the arrows between the logical address space 450 and the chunk address space 490 of FIG. 4D, the num_chunks for L_1=4. Thus, the logical map of FIG. 4D may be represented by the single n-tuple: <L_1>→<C_10, 4>. Because of the high locality of the logical and chunk address spaces, this compact notation encodes four logical to chunk mappings: <L_1>→<C_10>, <L_2>→<C_11>, <L_3>→<C_12>, and <L_4>→<C_13>. Because only a single n-tuple is required to represent the logical mapping of FIG. 4D, the B-tree encoding the logical mapping of FIG. 4D is more compact than the B-tree required for FIG. 4C (which required 4 n-tuples). Thus, the B-tree of FIG. 4D may be smaller, faster to traverse, and/or more compressible than the B-tree of FIG. 4C.

The mapping between the chunk address space 490 and the segment address space 470 may be referred to as the chunk mapping. The chunk mapping may have an n-tuple representation of: <chunk_ID>→<seg_ID, num_chunks, ref_count>, where similar to above, num_chunks indicates the number of consecutive (or contiguous) chunks that map to the seg_ID. Thus, the chunk mapping of FIG. 4D may be represented by 2 n-tuples: <C_10>→<seg_1, 2, ref_count seg_1>, <C_12>→<seg_2, 2, ref_count_2>. These two n-tuples encode the four mappings: <C_10>→<seg_1, 1, ref_count 1>, <C_11>→<seg_1, 2, ref_count_1>, <C_12>→<seg_2, 1, ref_count 2>, and <C_13>→<seg_2, 2, ref_count_2>. The chunk mapping of FIG. 4D is relatively compact, requiring only 2 n-tuples, as compared to the 4 n-tuples required for the "virtual layer" to the segment layer of FIG. 4C.

In some embodiments, to preserve the content aware storage for deduplication purposes, a mapping between a hash value space and the chunk address space may also be included in the metadata. FIG. 4E is a block diagram illustrating content aware addressing of data chunks, in accordance with some embodiments. More specifically, FIG. 4E illustrates a hash value mapping (or hash mapping) 430 for the metadata encoded in FIG. 4D. The hash mapping maps the hash value space 460 (see FIG. 4C) to the chunk address space 490. The hash mapping of FIG. 4E requires 4 n-tuples: <"2459">→<C_13>, <"78E5">→<C_11>, <"BA36">→<C_10>, and <"FD02">→<C_12>.

In various embodiments, the logical mapping and chunk mapping of FIG. 4D, as well as the hash mapping 440 of FIG. 4E may be included in the metadata for a data object. As noted throughout, such metadata may be encoded in a B-tree (e.g., copy-on-write (COW) B-tree or a Log-Structured Merging Tree (LSM Tree)). The logical mapping may be associated with the logical layer 412 of FIG. 4A, while the chunk mapping and the hash mapping may be associated with the CAS layer 414 of FIG. 4A. To implement such mappings encoded in the metadata, a vDFS (e.g., vDFS 304 and vDFS 334 of FIG. 3) may implement a two-layered metadata mechanism. The first layer may be a logical layer that implements and traverses the B-trees encoding the mapping. The second layer may be a chunk store layer that generates (or allocates) new chunk_IDs for new chunks and enables the reading, writing, allocating, and freeing of data chunks. Each new chunk_ID allocated by the chunk store layer may be the "next" chunk_ID (in view of the most recent previous chunk_ID) in the natural ordering of the chunk IDs. In some embodiments, there may be no practical upper limit to the number of available chunk_IDs. The chunk store may be a CAS aware store, and thus the vDFS may implement chunk-level deduplication. The vDFS may employ a LFS file system for the data.

A vDFS may be responsible for chunking the data. The size of the data chunks may be variable and be based on a structure, arrangement, organization, and/or composition of the data itself. The size of the data chunks may be anything smaller than the size of data segments, but in some embodiments, the size of the chunks may vary from 1 kB to 1 MB. Thus, a single data segment may include numerous data chunks. In some embodiments, the data is chunked such that each chunk is approximately 80 kB.

In some embodiments the chunk mapping may take the following form: <inode_ID, type, lba>→<chunk_ID, chunk_size>, where inode_ID identifies a particular inode of the vDFS, type indicates a type or category (e.g., File_Map) of the inode identified by inode_ID, and chunk_size indicates the size of the chunk. The size of the chunk indicated by size chunk in logical blocks. In such embodiments, the size of the key may be 16-bytes wide. As discussed below, a vDFS may encode snapshots via key-value pairs encoded in a B-Tree (e.g., a COW B-Tree).

When taking a new snapshot (e.g., snapshot_ID=6) of a data object (inode_ID=i10 and type=File_Map), the "new" or "different" data for a snapshot is written to a newly allocated chunk. In snapshot_ID=5 (e.g., the snapshot previous to snapshot_ID=6), the logical mapping may include the two key-value pairs: <i10, File_Map, L_0>→<C_1, 10003> and <i10, File_Map, L_10003>→<C_2, 12007>. Thus, in the fifth snapshot of the data object, the chunk_size of C_1 is 10003 logical blocks and the chunk_size of C_2 is 12007 logical blocks. The logical addresses L_0 through L_10002 are mapped to the C_1 chunk, while the logical addresses L_10003 through L_22009 are mapped to the C_2 chunk.

The user may edit data within the C_1 chunk (e.g., the user may add an additional 20 blocks to the data associated within C_1), and not edit data within the C_2 chunk. When snapshot_ID=6 is taken, the data for the entire object is re-chunked. After the re-chunking, a new chunk is allocated for the updated data. Because chunks are allocated with sequential and/or contiguous chunk identifiers (and assuming that the data object includes only two chunks: chunk_ID=C_1 and chunk_ID=C_2), the newly allocated chunk is identified as chunk_ID=C_3. Because the updated data includes an additional 20 blocks of data (and the data associated with chunk_ID=C_2) the chunk size of the new chunk C_3 is chunk_size=10023. The logical mapping of snapshot_ID=6 includes the two key-value pairs: <i10, File_Map, L_0>→<C_3, 10023> and <i10, File_Map, L_10023>→<C_2, 12007>. Thus, for this new snapshot, the logical addresses L_0 through L_10022 are mapped to the new C_3 chunk, while the logical addresses L_10023 through L_22029 are mapped to the older C_2 chunk. The C_1 chunk is still stored for recovery of the snapshot_ID=5 snapshot, however, C_1 is not included in the snapshot_ID=6 snapshot.

Figure 5A:
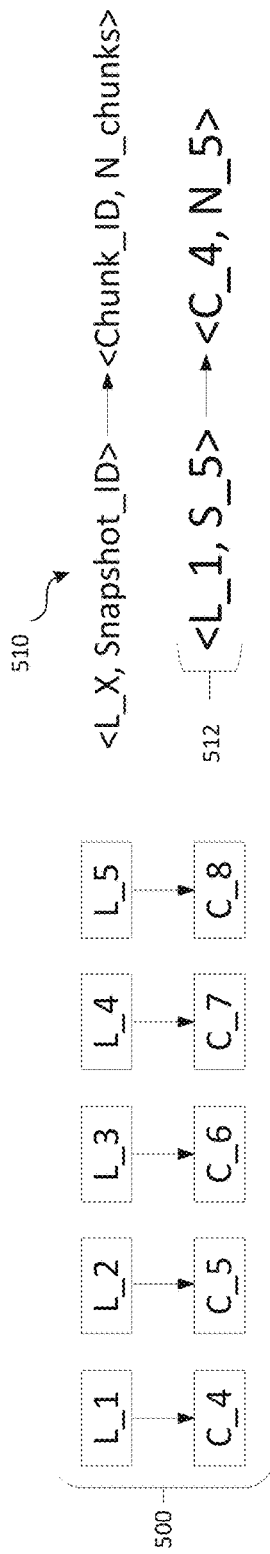
FIGS. 5A-5C include block diagrams illustrating schemas for storing snapshots of a data object, in accordance with some embodiments.
Figure 5B:
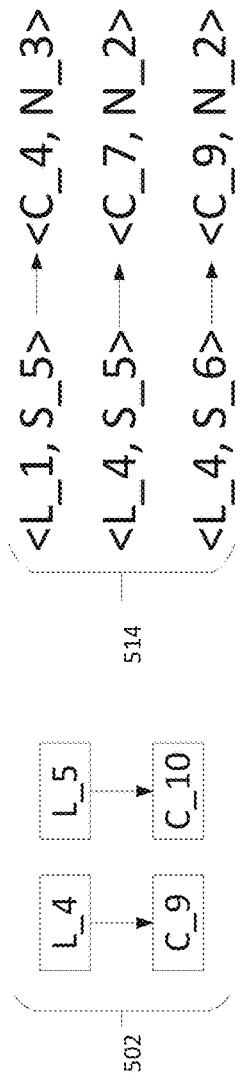
Figure 5C:
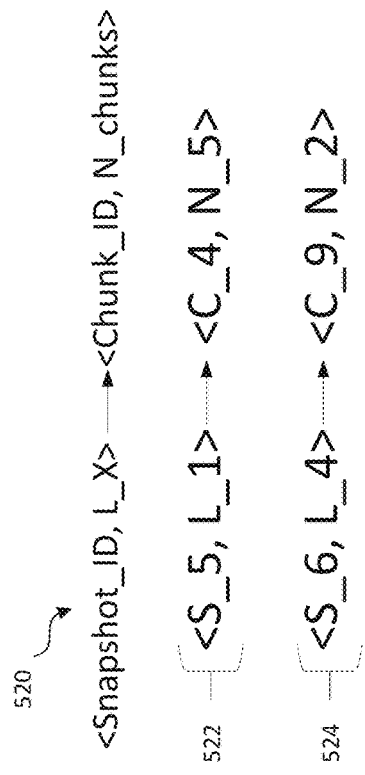

FIGS. 5A-5C include block diagrams illustrating schemas for storing snapshots of a data object, in accordance with some embodiments. FIG. 5A shows the mapping between the logical address space and the chunk address space of two consecutive snapshots. Mapping 500 shows the mapping of the logical address space to chunk address space of the fifth snapshot (e.g., snapshot_ID=5) of the data object. In the compact notation discussed in conjunction with FIG. 4D (<lba>→<chunk_ID, num_chunks>), the mapping 500 may be captured by the single n-tuple <L_1>→<C_1, N_5>, where N_5 indicates the number of contiguous logical addresses mapped to corresponding contiguous chunk addresses. In this non-limiting example, the size of each chunk is equivalent to the size of a logical block. The user may edit data within the logical blocks L_4 and L_5. In the next snapshot (e.g., snapshot_ID=6), new chunks may be sequentially allocated (e.g., C_9 and C_10) for the edited data corresponding to L_4 and L_5. Mapping 502 shows the logical to chunk mapping for snapshot_ID=6, where the mapping of snapshot_ID=5 between <L_1>→<C_1>, <L_2>→<C_2>, and <L_3>→<C_3> (of mapping 500) is still valid. The mapping encoding snapshot_ID=6 needs to account for the mapping of the new chunks (<L_4>→<C_9> and (<L_5>→<C_10>), while disregarding the previous mappings (of snapshot_ID=5): (<L_4>→<C_7> and (<L_5>→<C_8>).

As noted, snapshots may be encoded in a B-Tree (e.g., a COW B-Tree) stored in the object's metadata. More specifically, the snapshots are encoded in key-value pairs that arranged in a B-Tree. FIG. 5B shows a first schema 510 for the key-value pairs encoding snapshots, while FIG. 5C shows a second schema 520 for the key-value pairs encoding snapshots. The first schema 510 has the first format <L_X, snapshot_ID>→<chunk_ID, num_chunks>. The second schema 520 has the second format <snapshot_ID, L_X>→<chunk_ID, num_chunks>. Note that in the non-limiting embodiments of FIGS. 5B-5C, the object_ID keys (e.g., inode_ID, type) are omitted for simplicity. In both schemas 510/520, the object_ID keys would be the most significant components of the key.

As noted above, the ordering of the components of a key and/or paired values may be significant, at least because of the placement or insertion of the key-value pair in a B-Tree. When inserted into a B-tree, the keys are sorted via the ordering of the components in the n-tuple representation. The most significant component being the primary component for the sorting and the least significant component being the least-significant component for the sorting. Thus, keys with a common $1^{st}$-order component are grouped together first. Keys with a common $1^{st}$-order component and a common $2^{nd}$-order component are grouped together (within the initial grouping of the common 1-st order component), and so on until the least significant component. Thus, all keys with a common $1^{st}$-order component may grouped in a similar region (e.g., all within the same sub-tree) of the B-Tree. Keys with a common $2^{nd}$-order component (but dissimilar $1^{st}$-order components) may be located in disparate regions (e.g., separate sub-trees) of the B-tree.

In the first schema 510, the logical address component is more significant than the snapshot_ID component. Thus, when key-value pairs represented by the first schema 510 are inserted into a B-Tree, the keys are sorted by the logical address before sorting by the snapshot_ID. In the second schema 520, the snapshot_ID component is more significant than the logical address component. Thus, when key-value pairs represented by the second schema 520 are inserted into a B-Tree, the keys are sorted by the snapshot_ID before sorting by the logical address.

FIG. 5B shows the n-tuples required for encoding snapshot_ID=5 and snapshot_ID=6 via the first schema 510. Encoding 512 encodes snapshot_ID=5 via first schema 510. Encoding 514 show an updating of the encoding 512 to account for snapshot_ID=6. Because first schema 510 arranges the n-tuples via a common logical address (rather than a common snapshot_ID), note that encoding 514 requires the splitting of encoding 512 from <L_1, S_5>→<C_4, N_5> to <L_1, S_5>→<C_4, N_3> and <L_4, S_5>→<C_7, N_2>. Thus, when snapshot_6 is captured, the B-tree has to be updated to account for this splitting of the n-tuple representation. Also note the effect when traversing the updated B-Tree for looking up values for a key. First schema 510 optimizes looking up the values for a specific logical address for all snapshots. However, when trying to perform a lookup for a specific snapshot (with a snapshot_ID smaller (e.g., snapshot_ID=5) than the tree's current snapshot_ID (e.g., snapshot_ID=6)), then the B-tree must be traversed multiple times to find all instances of a key that includes the snapshot_ID corresponding to the snapshot that is being recovered. That is, disconnected regions of the tree (regions encoding snapshot_ID=5) need to be located and traversed.

FIG. 5C shows the n-tuples required for encoding snapshot_ID=5 and snapshot_ID=6 via the second schema 520. Encoding 522 encodes snapshot_ID=5 via second schema 520. Encoding 524 show an updating of the encoding 522 to account for snapshot_ID=6. Note that because the n-tuple representation is arranged around common snapshot IDs, the splitting of the n-tuple representation of from snapshot_ID=5 to snapshot_ID=6, as required via the first schema 510, is not required for the second schema 520. When recovering snapshot_ID=5 from a B-Tree that encodes subsequent snapshots, the tree only needs traversed along regions of the common snapshot_ID=5. Thus, in some embodiments, second schema 520 may be preferable over first schema 510. However, note the tradeoff for the second schema 520. To lookup the values for L_4 and L_5 for all snapshots, multiple traverses of the tree are required. That is, disconnected regions of the tree (regions encoding L_4 and L_5) need to be located and traversed. Thus, in other embodiments, first schema 510 may be preferred over second schema 520.

As discussed in conjunction with FIG. 3, when taking a snapshot of an object, an uploader agent of a SDDC (e.g., uploader agent 352 of primary SDDC 310) may upload block-level differences of the data object to a data store (e.g., data store 322). The uploader agent also communicates the uploading of a snapshot to an uploader server of an object storage and recovery system (e.g., uploader server 342 of OSRS 340). If a system failure (e.g., a disruption in the communication network that allows communication between the SDDC, data store, and/or OSRS) occurs during the uploading, the uploading of the snapshot will not be completed. The probability that a system failure occurs during an upload of a snapshot is non-zero. Furthermore, because data objects may be of significant size, a large amount of difference data may need to be transferred from the SDDC to the data store. The probability for such a system failure is increased for longer upload periods.

In conventional systems, the recovery from a system failure cannot be simply to re-start the uploading from the last data that was uploaded prior to the failure. If this approach is undertaken, data may be duplicated in the snapshot. Since difference-based snapshots require that data not be duplicated within a single snapshot, this method may result in data corruption. Many conventional systems may recover from the system failure by re-starting the data upload, from the beginning of the failed snapshot, when the system's resources become available again. In this way, data may not be duplicated within a snapshot. However, because significant amounts of data may need to be uploaded, re-starting the upload may be a wasteful solution because significant amounts of the system's resources (e.g., network bandwidth) may be required to re-start the upload. For example, if the failure occurs after 95% of the data to be uploaded has been successfully uploaded, it is inefficiently to re-upload the 95% in order to upload the remaining 5% of the data. Furthermore, if another failure occurs after the uploading is re-started, then the upload may have to be re-started a second time.

The various embodiments provide an enhanced methods for uploading snapshots. The uploading methods of the various embodiment tolerate system failures during an upload, and are significantly more efficient than conventional methods. The various embodiment ensure that data is not duplicated within a single snapshot, and thus are not prone to data corruption from starting the upload, after a failure, based on the last known successfully upload block. In the various embodiments, each snapshot has a state variable associated with its successful uploading, (e.g., an upload_status state). When the uploading of a snapshot is initiated, the value of the upload_status state is assigned a value of "Not_Complete". The SDDC may receive an acknowledgment signal, from the destination of the upload or another resource in communication with the destination (e.g., a data store or an OSRS), for each uploaded block that the block was successfully uploaded. If the acknowledgment signal is not received, then the SDDC is aware that the block was not received. Thus, the SDDC may be aware of the success (or failure) of uploading each block during an upload. If all the blocks are acknowledged as having been successfully uploaded, then the upload_status state of the snapshot may be transitioned to a value of "Complete".

If a system failure occurs during an upload for a snapshot, then the upload_status state for that snapshot is not transitioned to complete. Thus, the SDDC is aware of whether a snapshot upload has been successfully completed. After the system recovers, a new snapshot (with a new snapshot_ID) is initiated. For example, a system failure may occur during snapshot_ID=N. Because the last block to be transmitted has not yet been transmitted (or its successful upload has not been acknowledged), snapshot_ID=N is not completed. After the system recovers, a new snapshot (e.g., snapshot_ID=N+1) is initiated. The first block data transmitted in the new snapshot may be the next block, after the last successfully acknowledged block from the previous failed snapshot. This may result in the re-transmittance of a small amount of data (e.g., data that has been uploaded, but the failure occurred prior to receiving the successful acknowledgment signal). However, the re-transmitted data is not included in the same snapshot, and thus the embodiments are not prone to data corruption. Furthermore, only a small amount of data may need to be re-transmitted, reducing the inefficiencies of re-starting the upload from the beginning. Due to the system failure during the upload, snapshot_ID=N may not be recoverable (e.g., the snapshot is not a complete snapshot), but the successfully uploaded data may be employed to recover snapshot_ID=N+1. The methods for uploading a snapshots, as well as deleting snapshots, are discussed in conjunction with FIGS. 5D-5E.

Figure 5D:
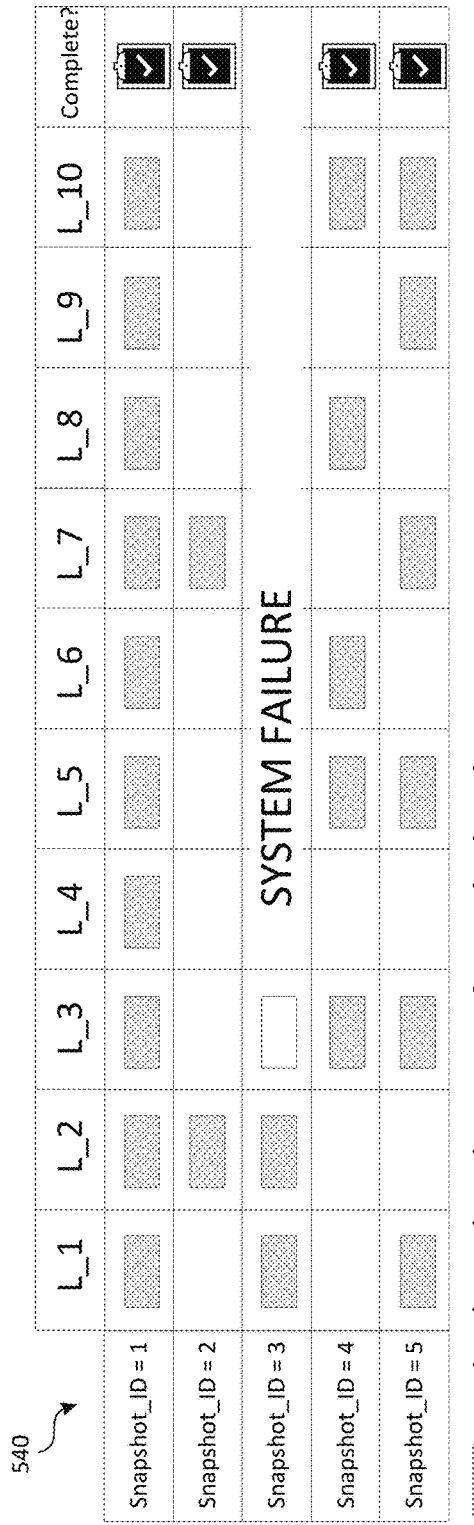
FIG. 5D is a block diagram illustrating a fault-tolerant process for uploading snapshots of a data object, in accordance to the various embodiments.

FIG. 5D is a block diagram illustrating a fault-tolerant process for uploading snapshots of a data object, in accordance to the various embodiments. The 2D table 540 in FIG. 5D illustrates the uploading of the object's first five snapshots. A horizontal row in the table 540 indicates a single snapshot, and a vertical column represents a single logical address. Each cell in the table 540 corresponds to an upload of the corresponding logical block (as indicated by the cell's column) for the corresponding snapshot (as indicated by the cell's row). A rectangle placed in the cell indicates that the block was uploaded by the SDDC for the snapshot. If the rectangle is shaded or "hatched", the SDDC received the successful acknowledgment signal. If the rectangle is not shaded then the SDDC uploaded the block, but did not receive the acknowledgment signal for the block. The last column (e.g., the column labeled "Complete?") in the table 540 indicates the value of the upload_status state variable for the snapshot. A "check" in the snapshot's cell of the last column indicates that the value of upload_status is set to "Complete." An absence of the check indicates that value of the upload_status is "Not Complete". A system failure occurred during the upload of snapshot_ID=3, and thus its upload_status state variable is set to "Not Complete." As shown in the column of the table 540, the upload_status state variable of each of the other snapshots is set to "Complete."

As shown in table 540, a first snapshot (e.g., row corresponding to snapshot_ID=1) is taken of a data object. For purposes of illustration, the object is 10 blocks wide, with logical address ranging from L_1 to L_10. However, this embodiment is non-limiting, and an object may include significantly more blocks. Because snapshot_ID=1 is the base-level snapshot, each of the 10 are uploaded. As shown by the 10 shaded rectangles in the first row of the table 540, each of the uploaded blocks were acknowledged as being successfully uploaded, and the snapshot is indicated as complete. For snapshot_ID=2, the only differences in the data occur in L_2 and L_7. The shaded rectangles corresponding to these blocks indicate the successful uploading of these blocks, and snapshot_ID=2 is marked as complete.

For snapshot_ID=3, the data has been edited such that blocks L_1, L_2, L_3, L_5, L_6, L_8, and L_10 are marked for uploading. The SDDC uploads L_1, L_2, and L_3 prior to the system failure. As indicated by the shaded and not shaded rectangles in the third row of the table 540, the SDDC received the acknowledgment signal for L_1 and L_2, but not for L_3. Because upload_status state variable is marked as "Not Complete" for snapshot_ID=3, when the system resources come back online, snapshot_ID=4 is initiated. Snapshot_ID=4 is initiated by starting with L_3 because the signal indicating its successful upload has not been received by the SDDC. Snapshot_ID=4 finishes the intended upload of snapshot_ID=3 successfully and is marked complete after successfully uploading L_3, L_5, L_6, L_8, and L_10. Snapshot_ID=5 is successfully completed by successfully uploading blocks L_1, L_3, L_5, L_7, L_9, and L_10. As noted above, snapshot_ID=3 is not recoverable, but its versions of L_1 and L_2 are needed to recover snapshot_ID=4, and its version of L_2 is required to recover snapshot_ID=5.

Figure 5E:
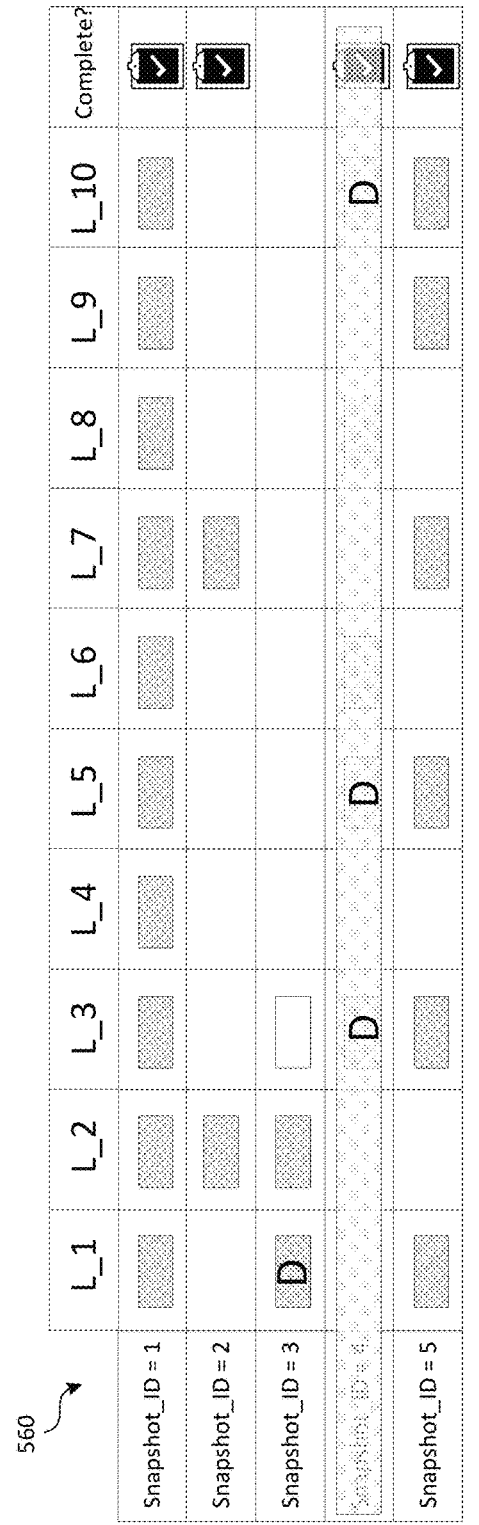
FIG. 5E is a block diagram illustrating a process for deleting snapshots of a data object, in accordance to the various embodiments.

FIG. 5E is a block diagram illustrating a process for deleting snapshots of a data object, in accordance to the various embodiments. FIG. 5E shows the table 560, which includes the five snapshots of FIG. 5D, where snapshot_ID=4 is to be deleted. The cells marked with a "D" correspond to blocks (of a snapshot) that may be deleted when snapshot_ID=4 is deleted. More particularly, not all of the blocks of snapshot_ID will be deleted because some of the blocks may be required to reconstruct snapshot_ID=5 (or later snapshots). For example, because L_6 and L_8 remain unchanged between snapshot_ID=4 and snapshot_5, these blocks stored for snapshot_ID=4 are required to recover snapshot_ID=5. Furthermore, some of the blocks (e.g., L_1) stored for snapshot_ID=3 may be deleted because snapshot_ID=4 is the only snapshot that requires this block for recovery. i.e., L_1 was edited for snapshot_ID=5.

In general, to delete snapshot_ID=N, then all snapshots with (a snapshot_ID<=snapshot_ID=N) and (a snapshot_ID> than the most recent previous snapshot) are identified. Blocks within these identified snapshots are identified by deletion based on difference between the blocks of these identified snapshots and the corresponding blocks in snapshot_ID=N+1. For this example (deletion of snapshot_ID=4), snapshot_ID=3 and snapshot_ID=4 are identified. Because differences between snapshot_ID=5 and the identified snapshots occur in L_1, L_3, L_5 and L_10, these blocks may be deleted. Note that blocks corresponding to L_6 and L_8 in snapshot_ID=4 are not marked for deletion because they are needed for the recovery of snapshot_ID=5.

Figure 6A:
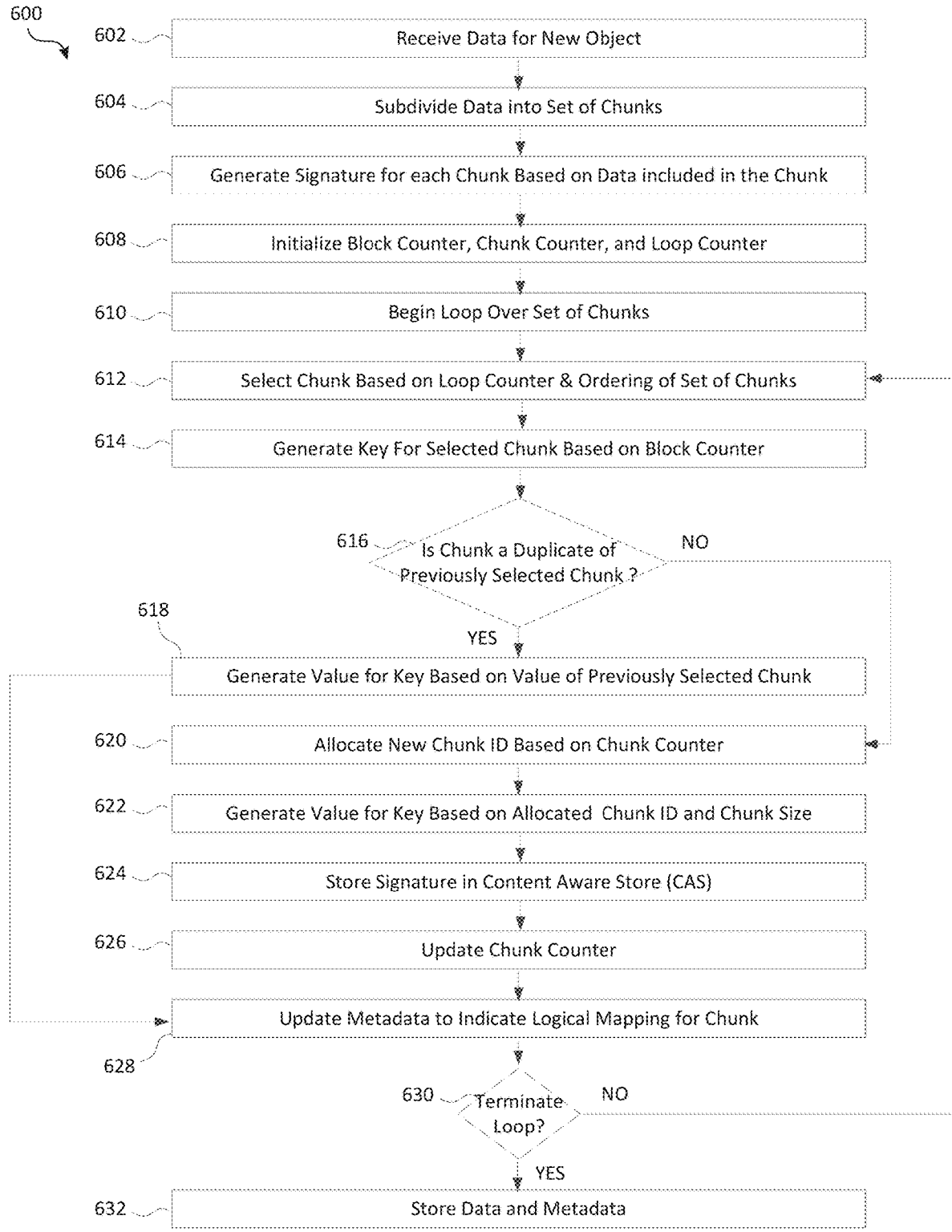
FIG. 6A illustrates a flowchart of exemplary processes for storing data in a distributed-computing system, in accordance with some embodiments.
Figure 6B:
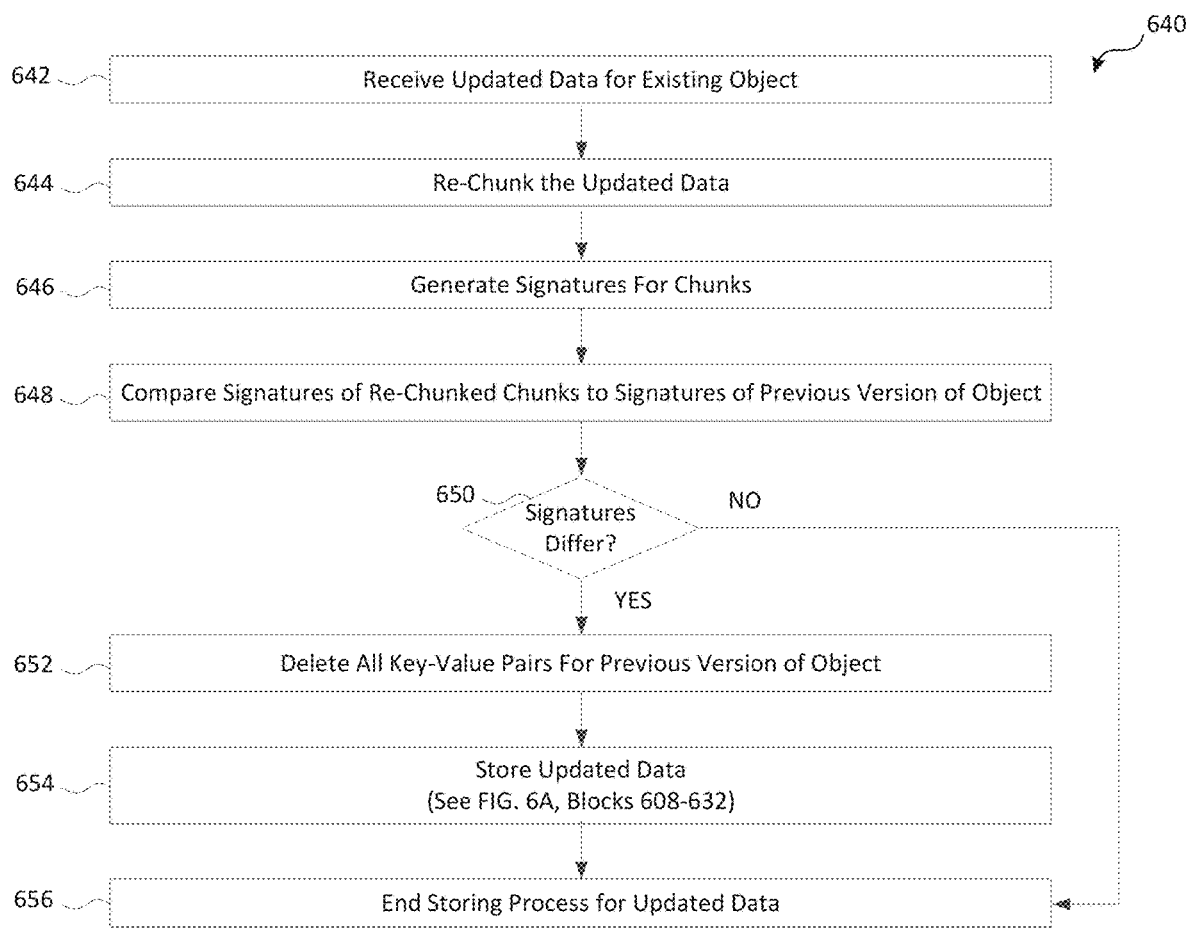
FIG. 6B illustrates a flowchart of an exemplary process for updating stored data in a distributed-computing system, in accordance with some embodiments.
Figure 6C:
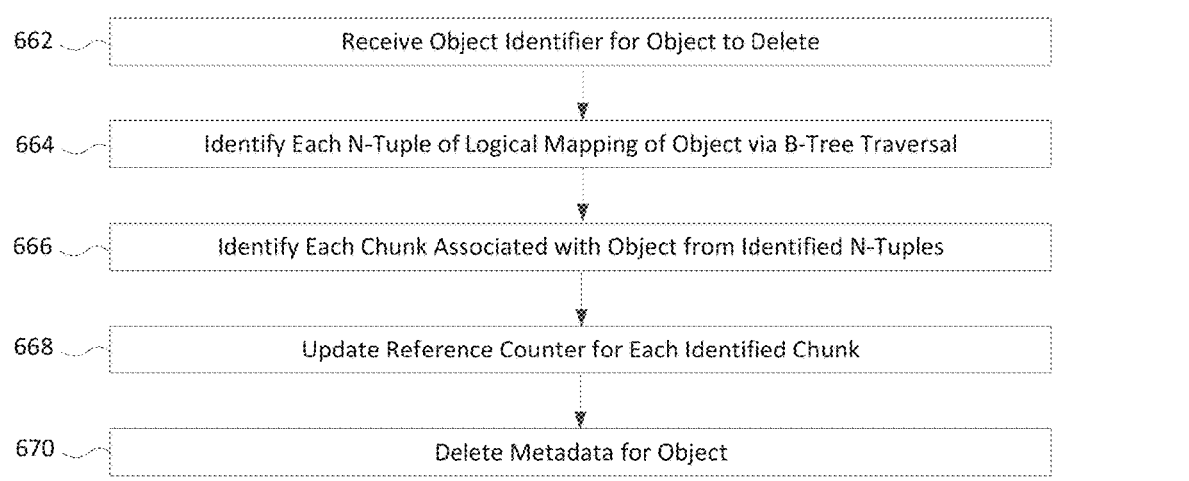
FIG. 6C illustrates a flowchart of an exemplary process for deleting stored data in a distributed-computing system, in accordance with some embodiments.
Figure 7:
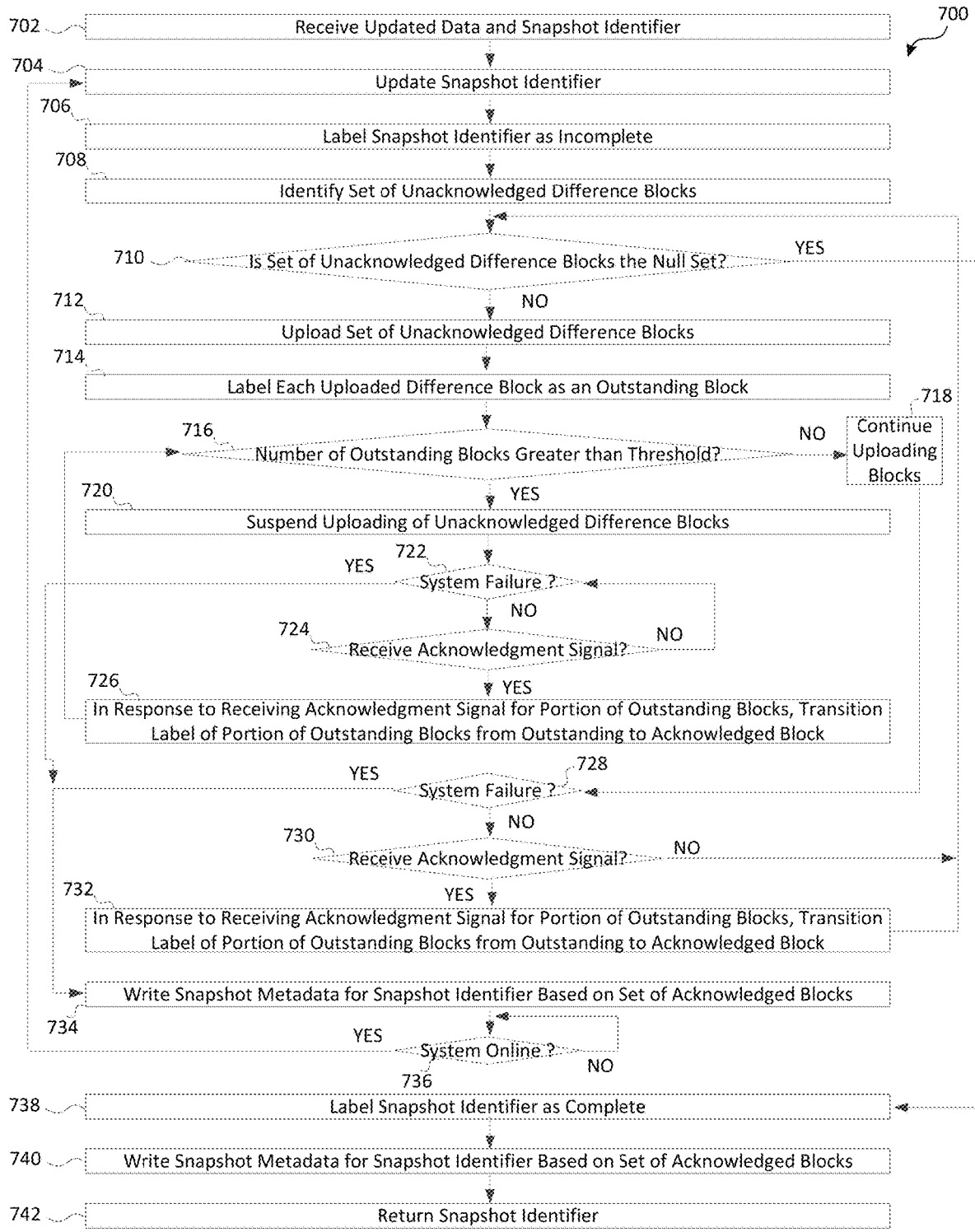
FIG. 7 illustrates a flowchart of an exemplary fault-tolerant processes for uploading a snapshot of a data object to an accessible data store, in accordance with some embodiments.

FIGS. 6A-7 illustrate flowcharts for exemplary processes 600-700, in accordance with some embodiments Processes 600-700 are performed, for example, at one or more storage nodes of a cluster of storage nodes operating in the cloud-computing environment. In some embodiments, the distributed-computing system comprises a plurality of storage nodes or host computing devices (e.g., host computing device 100 described in reference to FIG. 1A) that are communicatively coupled together in a vSAN. In some embodiments, the distributed-computing system is implemented by one or more virtual machines (e.g., VM 102 described in reference to FIGS. 1A-1B). The distributed-computing system implements, for example, any of the components discussed in conjunction with environment 300 of FIG. 3 (e.g., an object storage & recovery system and/or a software designed data center). In some embodiments, the operations of any of processes 600-700 are distributed across the various systems (e.g., storage nodes) of the distributed-computing system. In processes 600-700, some blocks are, optionally, combined, the order of some blocks is, optionally, changed, and some blocks are, optionally, omitted. In some embodiments, additional operations may be performed in combination with any of processes 600-700.

FIG. 6A illustrates a flowchart of an exemplary process 600 for storing data in a distributed-computing system, in accordance with some embodiments. Process 600 begins at step 602, where data is received for a data object. The data may be structured as a consisting of a set of data blocks. The set of blocks may be an ordered set (e.g., block_1, block_2, block_3, . . . , block_M, where M is any positive integer). Each data block may be assigned a logical block address (lba), and be addressable via its lba. Assigning an lba (e.g., L_X) to a block may be based on the ordering of the set of blocks (e.g., L_1→block_1, L_2→block_2, L_3→block_3, . . . , L_M→block_M). That is, a unique (to the data object) logical address may be sequentially and/or contiguously assigned to each block of the set of data blocks of the object. The logical address assignment may be based on the ordering of the set of data blocks. The received data (along with its object_ID, e.g., inode_ID and type) may be transmitted to and/or received from a data store and/or SDDC. Thus, the data may be structured as a set of data segments, where each data segment includes multiple blocks of data.

At step 604, the data may be subdivided into a set of data chunks. That is, the data may be "chunked" in an ordered set of chunks. In various embodiments, a chunking method or algorithm is employed to chunk the data. The chunking algorithm may identify "natural breakpoints" in the data to determine the block addresses of the start point and end point for each of the chunks. A breakpoint for a chunk may be identified via a "signature" within a fingerprint of the data. By identifying natural breakpoints based on chunk content, the chunking algorithm may be resistant to shifts in the objects data. Thus, when re-chunking edited data, the boundaries of a chunk are likely to be invariant (with respect to which data the chunk includes) in the re-chunking, even though additional or less data may be included in the new chunk. The chunking method may include employing a sliding window and a fingerprinting algorithm. The implemented fingerprinting algorithm may include a hash function, such as but not limited to a Rabin fingerprinting scheme. In some embodiments, the size of the chunks may be variable and may vary from 1 kB to 1 MB. Thus, a single data segment may include numerous data chunks. In some embodiments, the data is chunked such that each chunk is approximately 80 kB.

When the data is subdivided into a set of chunks, each chunk in the set of chunks may include a subset of the set of blocks. In some embodiments, each chunk includes a plurality of chunks. Each block may be included in only a single chunk, such that an intersection of any two subsets of blocks is the null set. Chunking the data may be based on the ordering of the blocks, such that the blocks included in a chunk are contiguous blocks. The ordering of the set of chunks may be based on the ordering of the blocks included in the chunks. The ordering of the set of chunks may be based on the ordering of the blocks included in the chunks. The set of chunks may include N chunks, where N is any positive integer.

At step 606, a signature is generated for each chunk. Generating the signature for a particular chunk may be based on the data of the subset of blocks that is included in the particular chunk. In at least one embodiment, the signature for the particular chunk may be a hash value (generated by a hash function) of the data included in the particular chunk.

At step 608, values for a block counter (e.g., block_counter), a chunk counter (e.g., chunk_counter), and a loop counter (e.g., loop_counter) may be in initialized. In some embodiments, the value of the block counter may be initializes based on an initial logical address of the sequentially assigned logical addresses of the data object. The value for the block counter may be initialized such that block_counter=1. In some embodiments, the value of the chunk counter may be initialized based on a chunk identifier of the most recently processed chunk. The chunk counter may be initialized to a value corresponding to a single increment of the chunk_ID of the most recently processed chunk. For example, if the last processed chunk of a previous object has a chunk_ID=100, then the chunk counter may be initialized at step 608 such that chunk_counter=101. The value of the loop counter may be initialized such that loop_counter=1. In various embodiments, the block counter counts the number of data blocks of the object processed via process 600. The chunk counter may be employed to determine a unique value for chunk identifier (e.g., chunk_ID) for newly allocated chunk identifiers. In at least one embodiment, the chunk counter may be initialized such that chunk_counter=1. The loop counter counts the number of times through the loop defined by blocks 610-630. In some embodiments, the total number of times through the loop of blocks 610-630 may be equivalent to the number of chunks included in the set of chunks (e.g., the cardinality of the ordered set of chunks). At step 610, a loop over the set of blocks is initiated.

At step 612, a chunk is selected from the set of chunks based on the chunk counter. The selection of the chunk may be based on the ordering of the chunk and the chunk counter. For example, during the first time through the loop (e.g., loop_counter=1), the $1^{st}$ chunk of the set (based on the ordering of the set of chunks) may be selected at step 612. During the $2^{nd}$ time through the loop (e.g., loop_counter=2), the $2^{nd}$ chunk of the set (based on the ordering of the set of chunks) may be selected, and so on. For the discussion corresponding to blocks 614-630, the chunk selected at step 610 may be referred to as the next (or selected) chunk selected from the set of chunks. The selected chunk (e.g., the next chunk) has a particular (or next) signature associated with it, and includes a number of data blocks.

At step 614, a key for the selected chunk (e.g., a next key) may be generated based on the block counter. In the various embodiments, the value of the block counter may correspond to the logical address of the first block (based on the ordering of the set of data blocks) in the selected chunk. For example, during the first time through the loop, loop_counter=1 and the logical address of the first block in the first selected block is L_1. The key generated at step 614 may be included in a logical mapping (e.g., a mapping that goes from the logical address space to the chunk address space). As discussed throughout, the key may be generated via the n-tuple <object_ID, lba>. The value for lba may be the logical address of the first block for the selected chunk, and thus may be determinable from the value of the block counter. As also discussed above, the value for object_ID may include an inode identifier, as well as a type of the identified inode.

At decision step 616, it is determined whether the selected chunk is a duplication of a previously selected chunk. That is, it is determined whether the selected next chunk includes data that is equivalent to (or a copy of) data already stored by and/or processed by process 600. The duplicated chunk (e.g., the previously selected chunk) may have been selected during the loop for this object, or a previously processed object. The decision of step 616 may be based on a comparison of the signature of the selected chunk and a signature of the duplicated block. If the signatures (e.g., hash values) are equivalent, then the data blocks of the data in both the selected chunk and the previously selected chunk are identical, i.e., the selected chunk is a duplication of the previously selected chunk.

In some embodiments, the signature of each processed chunk is stored in a content aware store (e.g., a CAS). At decision step 616, the signature of the selected may be provided to the CAS. The CAS may store a signature mapping. The signature mapping may be a hash mapping, such as hash mapping 460 of FIG. 4E. The signature mapping may be a signature table and/or a signature index, e.g., a hash table and/or hash index. The CAS may store object level-hash tables, user-level hash tables, device-level hash tables, client level-hash tables, customer-level hash tables, SDDC-level hash tables, and/or data store-level hash table levels. The CAS may perform the comparison between the signature of the selected chunk and each of the signatures stored in the signature table. The CAS may provide a signal of whether the signature has already been stored at the CAS. If the signature of the selected chunk has already been stored in the CAS, the selected chunk is a duplication of a previously selected chunk. If the signature of the selected chunk has not been previously stored in the CAS, then the selected chunk is not a duplication of a previously selected chunk. If the selected chunk is a duplication of a previously selected chunk, then process 600 flows to step 618. When the selected chunk is a duplication of the previously selected chunk, then the signal from the CAS may indicate information regarding the duplicated chunk, such as but not limited to a chunk identifier and the size of the chunk, e.g., the number of blocks included in the duplicated chunk. If the selected chunk is not a duplicated chunk, process 600 flows to step 620.

Because the signatures for chunks that have been previously processed are stored (or cached) in the CAS, the method does not need to store multiple copies of identical chunks of object. Thus, process 600 provides deduplication services for data duplicated at the chunk level. Because signature (or hash) tables may be implemented for any combinations of distinctions between data object, customers, clients, and the like, such deduplication services may be provided at the data object level, the user level, the device level, the client level, the customer level, or any other such level of division within a SDDC or data store.

At step 618, and in response to determining that the selected chunk is a duplication of a previously selected chunk, a value for the key for the selected chunk (e.g., a value for the key of the selected chunk) may be generated based on the duplicated chunk, e.g., the previously selected chunk that is duplicated by the selected chunk. The value may be based on a chunk identifier for the previously selected chunk and the size of the previously selected chunk. Because the size of the selected chunk is identical to the size of the duplicated chunk, the value may be based on a number of blocks included in the selected chunk, or equivalently the number of blocks included in the duplicated chunk. In some embodiments, the value may be encoded in the format <chunk_ID, num_blocks>, where chunk_D is the chunk identifier for the duplicated chunk and num_blocks indicates its chunk size (in data blocks). Process 600 may flow to step 628.

At step 620, and in response to determining that the selected chunk is not a duplication of a previously selected chunk, a new chunk identifier may be allocated for the selected chunk. The new chunk identifier may be based on a current value of the chunk counter. Some embodiment may include a chunk store that allocates new chunk identifiers. As discussed throughout, new chunk identifiers may be allocated and/or generated in a contiguous sequence, e.g., C_1, C_2, C_3, and so on with no practical upper limit. Similar to the deduplication process discussed above, the new chunk identifiers may be sequentially and contiguously numbered at the object level, user level, client level, device level, customer level, and any other such level. The chunk store may employ the chunk counter to determine the chunk identifier. The chunk store may be generally responsible for the chunk counter. In some embodiments, the chunk counter may not be initialized at bock 608, because the chunk counter keeps a running count at the appropriate level (e.g., object, user, device, customer, or the like).

At step 622, the value for the key is generated based in the newly allocated chunk identifier and the size of the selected chunk. Similar to step 618, the value may be formatted as <chunk_ID, num_blocks>, where chunk_D is the chunk identifier allocated for the specific chunk and num_blocks indicates its size.

At step 624, the signature of the selected chunk may be stored in the CAS. For example, the hash table (at each of the appropriate levels) may be updated to include the mapping between the signature of the selected chunk and its chunk identifier. In some embodiments, the size of each chunk is stored in the hash table. As discussed throughout, the hash table (or hash mapping) may be encoded in key-value pairs stored in a B-tree. At step 626, the chunk counter is updated. The chunk store may sequentially increment the value of the chunk counter by increasing its value by 1.

Process 600 flows to step 628 (from step 618 or step 626). At step 628, the object's metadata may be updated to include an indication of an association between the key and the value in metadata for the data object. That is, the key and value may be stored as a key-value pair in a B-Tree (e.g., a COW B-Tree) included in the metadata to encode the logical mapping for the object. In some embodiments, the key and paired value may be inserted into the logical mapping B-Tree at step 628. Such logical mappings are discussed at least in conjunction with FIG. 4D, and provide a mapping between a logical address space and a chunk address space for the data object.

Also at step 628, the loop counter may be updated. That is, the value of the loop_counter may be incremented by 1. Also, the block counter is updated based on the chunk size. The value of block_count may be increased by the number of data blocks included in the selected chunk. Thus, the block counter keeps tabs of the number of data blocks processed by the loop of process 600. Thus, the block counter may be employed to determine the logical block address of the each block of each chunk. At decision step 630, it is determined whether to end or finish loop. The decision to end the loop may be based on the loop counter. If the loop counter is greater than the number of blocks in the data object (e.g., each chunk in the data object has been processed by the loop), the loop may be terminated. If the loop is not terminated, process 600 may flow back to step 612 to select the next chunk. Otherwise, the loop may be terminated and process 600 may flow to step 632.

At step 632, the data for the data object may be stored, e.g., in a data store. Each chunk may be stored in data store. The data store may employ a Log-Structured File System (LFS). The chunk of the data chunks of the data object are distributed over a set of data segments of the LFS. Each segment of the set of data segments may include a subset of the set of data chunks. The LFS may address each block of the set of data blocks by a segment address of a segment addresses space of the LFS. Via the loop of blocks 610-630, each chunk of the set of data chunks is uniquely identified by a chunk identifier of a set of sequential chunk identifiers. Thus, each chunk is addressed by chunk addresses of a chunk address space Storing the data may include generating a chunk mapping for the stored object. That is, storing the data may include generating a mapping for each chunk address of the chunk address space to a segment address of the segment address space. The chunk mapping may be similar to those embodiments discussed in conjunction with FIG. 4D. That is, the chunk mapping may provide a mapping between the chunk address space and the segment address space of the stored data, and be stored as key-value pairs in a B-Tree (e.g., a COW B-Tree). The metadata for the object (encoding the mappings between the logical address space, the chunk address space, the segment address space, and the hash values) may be stored at step 632.

Also at step 632, a snapshot of the data object may be captured. The snapshot of the data object may be encoded in the B-Tree mappings, via snapshot key-value pairs. A snapshot key may indicate a snapshot identifier (snapshot_ID) and a logical address of the data). A snapshot value for the key may indicate a chunk identifier for where the data of the logical address is included in. The snapshot captured at step 630 may be a first snapshot. Updated data may be received and a second snapshot of the data may be captured. The snapshot key-value pairs may be encoded in a B-Tree that sorts n-tuple representations of the snapshot key-value pairs via a common snapshot identifier.

FIG. 6B illustrates a flowchart of an exemplary process 640 for updating a stored data in a distributed-computing system, in accordance with some embodiments. Process 640 begins at step 642, where updated data of an existing object is received. The data, prior to being updated (e.g., edited by a user), may have been stored in the distributed-computing system via process 600 of FIG. 6A. At step 644, the data is re-chunked (e.g., the updated data is re-subdivided into a set of new chunks). In the various embodiments, the entirety of the data may be re-chunked, even if the data has been only slightly updated (e.g., the entirety of the data will be re-chunked even if the user only changes a single bit in the data). Various embodiments for chunking data are described at least in conjunction with step 604 of FIG. 6A. At step 646, a signature is generated for each of the data chunks. Various embodiments for generating a signature for a data chunk are discussed at least in conjunction with step 606 of FIG. 6A.

At step 648, the block signatures generated at step 648 are compared to the object's previous block signatures (e.g., the signatures generated for a most recent (but previous) updating of the data). If this is the first instance of a data update for the object, then the signatures will be compared to the signatures generated via process 600 of FIG. 6A. In some embodiments, an object signature list is generated and stored for each storing and/or updating of the data. The signature list may be kept in the CAS discussed at least in conjunction with process 600. At decision step 650, it is determined whether at least one of the signatures of the current version of the object (e.g., those signatures determined at step 646) is different from the signatures of the previous version of the object. If the signatures differ, then the updated data will be stored, via process 640 flowing to step 652. If the signatures are identical, then the data is identical (and does not need to be stored) and process 640 is terminated by flowing to step 656.

At step 652, the key-value pairs storing the objects logical mapping (for the previous version of the object) are deleted from the object's metadata. At step 654, the updated data is stored. Embodiments for storing data are discussed at least in conjunction with blocks 608-632 of FIG. 6A. Process 640 is halted and/or terminated at step 656.

FIG. 6C illustrates a flowchart of an exemplary process 660 for deleting a stored data in a distributed-computing system, in accordance with some embodiments. At step 662, the object identifier (e.g., Object_ID) for the object to delete is received. At step 664, identify each n-tuple of the logical mapping of the object. The n-tuples may be identified by traversing object's B-Tree encoding its logical mapping. The object identifier may be employed to locate the object's B-Tree. At step 666, each chunk associated with the object is identified, via the n-tuples identified at step 664. The associated chunks may be identified via accessing the values of the keys encoded in the identified n-tuples. At step 668, the reference counter is updated for each chunk identified at step 666. Updating the reference counter of an identified chunk may include decrementing the value of the reference counter by 1 because the object is being deleted. A garbage collection process may be generally responsible for deleting chunks where the value of the reference counter has reached 0. At step 670, the metadata for the object, including the logical mapping for the object is deleted.

FIG. 7 illustrates a flowchart of an exemplary fault-tolerant processes 700 for uploading a snapshot of a data object to an accessible data store, in accordance with some embodiments. Process 700 begins, at step 702 where updated data for the data object is received, as well as a snapshot identifier. The snapshot identifier may be an identifier of a most recent (but previous) snapshot. In various embodiment, the received snapshot identifier may refer to a previous snapshot that is directed towards a most recent (but previous) version of the data object. The updated data may be for a current, updated, and/or new version of the data object. At step 704, the received snapshot identifier is updated. To update the snapshot identifier, the received snapshot identifier may be incremented by one. For example, the received snapshot identifier may have a value of N, where N is a non-negative integer (e.g., snapshot_ID=N). The updated value may have a value of N+1, e.g., snapshot_ID=N+1. The updated snapshot identifier may identify the requested snapshot (e.g., the snapshot that includes the current, updated, and/or new version of the data). In instances where the first snapshot of a data object is the first snapshot for the data object, N=0, and there is no previous versions of the data object to refer to.

At step 706, the snapshot (or its corresponding snapshot identifier) is labeled as an incomplete snapshot. The label may be a state variable for the snapshot that indicates that the snapshot has not yet successfully been uploaded, and thus is not in a complete state. At step 708, a set of difference data blocks is identified. The identified difference blocks may be the blocks in the data that have been updated from and/or not included in the previous version of the data. That is, each block of the set of difference blocks includes data that is different from and/or not included in the data of a corresponding block of the previous snapshot of the object, where the previous snapshot is the snapshot identified via the snapshot identifier received at step 702. The set of difference blocks may be unacknowledged blocks. For example, a difference block that has been successfully uploaded to the data store may be labeled a label that indicates the blocks as being an acknowledged block. An uploaded block may be determined to be successfully uploaded via receiving an acknowledgment signal that indicates successfully receiving the block for the snapshot. Thus, the acknowledgment signal may include the value for the current snapshot identifier to indicate that the successful uploading of the block was for the current snapshot. Any block that is not labeled as an acknowledged block may be an unacknowledged block.

At decision step 710, it is determined whether the identified set of blocks is the null set. If the set of blocks is the null set, then process 700 flows to step 738. Otherwise, process 700 flows to step 712. At step 712, the set of difference blocks may begin being uploaded to the data store. The uploading may be asynchronous uploading, in that the blocks may be uploaded one after another, without receiving an acknowledgment of other handshaking mechanism from the data store. At step 714, as each block begins its upload, the block is labeled as an outstanding block. The label may be a state variable for the block. For a block that is in a state labeled as outstanding may be a block that has begun its uploading, however, an indication of a successful receipt of the block (e.g., a corresponding acknowledgment signal) has not yet been received.

Blocks 716-726 of process 700 are directed to ensure that an asynchronous upload of the data blocks is limited by an upload threshold, e.g., these blocks ensure an asynchronous upload does not upload a number of blocks, which is greater than the upload threshold, without receiving an acknowledgment from the upload's destination (e.g., the data store). At decision step 716, it is determined whether the number of outstanding blocks (e.g., the number of blocks that are labeled as outstanding) is greater than the upload threshold. If the number of outstanding blocks is less than the threshold, then process flows to step 718, where the uploading of the blocks is continued and process 700 then flows to step 728. Otherwise, if too many outstanding blocks have been uploaded without acknowledgment (e.g., as measured via comparison to the upload threshold), then process 700 flows to step 720. At step 720, the uploading of the blocks is suspended until the number of outstanding blocks drops below the upload threshold.

At step 722, it is determined whether a system failure has occurred. A system failure may include that the formerly accessible data store is no longer accessible. That is, a system failure occurred such that the data store has become inaccessible. If a system failure is detected, then process 700 flows to step 734. If no system failure is detected at step 722, then process 700 flows to step 724. At decision step 724, it is determined whether an acknowledgment signal for at least a portion of the outstanding blocks has been received. If such an acknowledgment signal is not received, then process 700 returns to step 722 to determine is a system failure is detected. If an acknowledgment signal for a portion of the outstanding blocks has been received, then process 700 flows to step 726. At step 726, and in response to receiving an acknowledgment signal for the portion of the outstanding blocks, the label (e.g., a state variable) for each outstanding block in the portion of the outstanding blocks is transition from indicating that the block is outstanding to indicating that the block is acknowledged (e.g., the block has been successfully uploaded). When a block is transitioned from an outstanding block to an acknowledged block, the block may be removed from the set of difference blocks. From step 726, process returns to decision step 716 to determine if the outstanding blocks count has been sufficiently reduced to fall below the upload threshold. If the count has been sufficiently reduced, process 700 flows to step 718, where the uploading of the blocks is re-started and/or continued. From step 718, process 700 flows to step 728. Otherwise, process 700 continues to step 720 to further suspend the uploading process until the count of outstanding blocks has been sufficiently reduced.

At decision step 728, similar to decision step 722, it is determined whether a system failure has occurred. If a system failure is detected at step 728, process 700 flows to step 734. Otherwise, process 700 flows to decision step 730. At decision step 730, similar to step 724, it is determined whether an acknowledgement signal has been received. If an acknowledgment signal has not been received, process 700 returns to step 710 to determine if the identified set of difference block is the null set. If an acknowledgment signal has been received, process 700 flows to step 732.

At step 732, similar to step 726 and in response to receiving an acknowledgment signal for the portion of the outstanding blocks, the label (e.g., a state variable) for each outstanding block in the portion of the outstanding blocks is transition from indicating that the block is outstanding to indicating that the block is acknowledged (e.g., the block has been successfully uploaded). When a block is transitioned from an outstanding block to an acknowledged block, the block may be removed from the set of difference blocks. From step 732, process returns to decision step 710 to determine if the set of difference blocks is the null set. If more blocks require uploading, then process 700 returns to step 712 to continue uploading blocks.

If a system failure is detected (at either step 722 or step 728), process 700 flows to step 734. At step 734, metadata for the unsuccessful (e.g., incomplete) snapshot is written and/or generated. The metadata written includes indications of each block that was successfully uploaded in the snapshot (e.g., the metadata includes an indication of each block that was transitioned from an outstanding block to an acknowledged block during the failed snapshot). The metadata for the snapshot may additionally indicate that the snapshot's state variable is set to incomplete. As noted throughout, an incomplete snapshot may not be recoverable. The metadata may include key-value pairs arranged in a B-Tree, as discussed in conjunction with at least the embodiments of FIGS. 5D-5E. After the metadata is written, process 700 flows to decision step 736, to determine whether the system is online and/or the failure of the has been resolved, e.g., the previously inaccessible data store has become accessible once again. Process 700 loops around decision step 736, until the system is back online. When system failure has been resolved, process 700 returns to step 704 to begin another snapshot after the uploading of this snapshot has failed. At step 704, the snapshot identifier is incremented and the next snapshot is started. Note that because any block that was transitioned to an acknowledged block during the uploading of the failed snapshot is labeled as an acknowledged block, will not be included in the next set of unacknowledged difference blocks identified in step 708. However, blocks still labeled as outstanding blocks will be included in the set of unacknowledged difference blocks.

When the set of difference blocks is the null set (e.g., each of the initially identified difference blocks has been successfully updated), process 700 flows from step 710 to 738. At step 738, the snapshot (or the snapshot identifier) is labeled as complete. At step 740, the metadata for the complete snapshot is written and/or generated. The metadata written may include includes indications of each block that was successfully uploaded in the snapshot (e.g., the metadata includes an indication of each block that was transitioned from an outstanding block to an acknowledged block during the completed snapshot). The metadata for the snapshot may additionally indicate that the snapshot's state variable is set to complete. The metadata may include key-value pairs arranged in a B-Tree, as discussed in conjunction with at least the embodiments of FIGS. 5D-5E. After the metadata is written, process 700 flows to step 742, where the snapshot identifier is returned.

Described herein are techniques for the efficient storage and recovery of difference-level snapshots for data objects. In one embodiment, a method for storing data on a distributed computing system is performed. The method may include receiving data of a data object. The data may be structured as an ordered set of data blocks. The data may be subdivide into an ordered set of data chunks. Each chunk in the set of data chunks may include an ordered subset of the set of data blocks. A next chunk of the set of data chunks may be selected. The selection of the next chunk may be based on at least one of the order of the set of chunks or a previous chunk identifier for a previously selected chunk of the set of chunks. A key for the next chunk may be generated based on an indication of an initial block of the next chunk. A value for the key may be generated. The value may be based on a number of blocks included in the next chunk. The value may be further based on at least one of a next chunk identifier for the next chunk or another chunk identifier for a duplicated chunk. Metadata for the data object may be updated to indicate an association between the key for the next chunk and the value for the key.

The method may further include determining whether the next chunk is a duplication of another chunk based on a next signature for the next chunk and duplicated signature for the duplicated chunk. The duplicated chunk may have been previously selected. In response to determining that the next chunk is a duplication of another chunk, the value for the key may be generated based on the number of blocks included in the next chunk and another chunk identifier for the duplicated chunk. The next chunk identifier for the next chunk may be allocated based on a previous chunk identifier for the previously selected chunk. The value for the key may be generated based on the number of blocks included in the next chunk and the next chunk identifier for the next chunk. A value for the previous chunk identifier may be updated to be the next chunk identifier.

In some embodiments, and in response to determining that the next chunk is not a duplication of another chunk, the method may further include storing an association between the next signature and the next chunk identifier in a content aware store (CAS). The CAS may store an association between the duplicated signature and the other chunk identifier for the duplicated chunk. In such embodiments, and in further response to determining that the next chunk is a duplication of another chunk, the method may further include incrementing a value for a reference counter for the duplicated chunk. The value for the key may be further based on the incremented value for the reference counter for the duplicated chunk. In further response to determining that the next chunk is not a duplication of another chunk, the method may further include initializing a value for a reference counter for the next chunk. The value for the key may be generated further based on the initialized value for the reference counter for the next chunk.

In some embodiments, for each chunk of the set of the data chunks, an associated chunk signature may be determined based on the subset of data blocks included in the chunk and a hash function. A unique logical block address (lba) may be assigned to each block of the set of data blocks based on the ordering of the set of data blocks. The key for the next chunk may encode the lba of the initial block of the next chunk. The value for the key may encode at least one of the number of sequential blocks in the next chunk or a number of contiguous chunks that in an ordered combination include a contiguous subset of the set of data blocks. The lba for each block in the next chunk may be indicated by the order of the blocks included in the next chunk and a combination of the encoded lba of the initial block of the next chunk and the encoded number of blocks included in the next chunk. A virtualized data center may be employed to provide the data of the data object. The virtualized data center may implement at least one of a virtual storage area network (vSAN), a virtual disk file system (vDFS), or a virtual machine (VM).

In various embodiments, the association between the key for the next chunk and the value for the key may be encoded in a key-value pair of at least one of a copy-on-write (COW) B-tree or a log-structured merge tree (LSM-tree) included in the metadata for the data object. The method may further include storing each chunk of the set of chunks in an object data store. The object data store may employ a Log-Structured File System (LFS). The set of data chunks may be distributed over a set of data segments of the LFS. Each segment of the set of data segments may include a subset of the set of data chunks. The LFS may address each block of the set of data blocks by a segment address of a segment addresses space. Each chunk of the set of data chunks may be uniquely identified by a chunk identifier of a set of sequential chunk identifiers. Each chunk may be addressed by chunk addresses of a chunk address space. In such embodiments, the method may further include generating a mapping for each chunk address of the chunk address space to a segment address of the segment address space.

In another embodiment, a method for uploading a first snapshot of a data object to an accessible data store is provided. The method may include identifying, within data of the data object, a first set of data blocks of the first snapshot. The first set of data blocks may include at least a first block and a second block. Each block of the first set of data blocks may include data that is different from data of a corresponding block of a previous snapshot. The previous snapshot may be a snapshot of the object that was taken previous to the first snapshot. An indication of a first snapshot identifier for the first snapshot and an indication of the first block may be encoded within first metadata of the first snapshot. The method may include uploading the first snapshot. While uploading the first snapshot, the first block may be uploaded to the data store. While uploading the first snapshot, and subsequent to uploading the first block, it may be determined that the data store has become inaccessible. In such an event, an indication that the first snapshot is an incomplete snapshot may be encoded within the first metadata for the first snapshot. In response to determining that the data store has become inaccessible, the uploading of the first snapshot may be terminated. Subsequent to terminating the uploading of the first snapshot, it may be determined that the data store has again become accessible subsequent to the data store becoming inaccessible while uploading the first complete snapshot In response to determining that the data store is again accessible, uploading a second snapshot of the data object may be initiated. A second snapshot identifier for the second snapshot of the data object may be generated. While uploading the second snapshot, the second block may be uploaded to the data store. An indication of the second snapshot identifier, an indication of the second block, and an indication that the second snapshot is a complete snapshot may be encoded within second metadata for the second snapshot.

In response to uploading the first block to the accessible data store while uploading the first snapshot, the method may further include generating a first label for the first block. The first label may indicate that the first block is an outstanding block. Prior to determining that the accessible data store has become inaccessible while uploading the first snapshot, a first acknowledgment signal may be received from the data store. The first acknowledgment signal may indicate a receipt of the first block while uploading the first snapshot. In response to receiving the first acknowledgment signal, the first label for the first block may be transitioned to indicate that the first block is an acknowledged block. The indication of the first block may be encoded within the first metadata. The encoding of the indication of the first block may be based on the first label for the first block indicating that the first block is an acknowledged block.

Prior to determining that the accessible data store has become inaccessible while uploading the first snapshot, the second block may be uploaded to the data store while uploading the first snapshot. In response to uploading the second block to the accessible data store while uploading the first snapshot, a second label for the second block may be generated. The second label may indicate that the second block is an outstanding block. The method may further include foregoing encoding, within the first metadata, an indication of the second block. The foregoing of the encoding of the indication of the second block may be based on the second label for the second block indicating that the second block is an outstanding block.

In such embodiments, in response to determining that the inaccessible data store has become accessible while uploading the first snapshot may further include uploading the second block to the data store while uploading the second snapshot. Uploading the second block may be based on the second label for the second block indicating that the second block is an outstanding block. A second acknowledgment signal may be received from the data store. The second acknowledgment signal may indicate a receipt of the second block while uploading the second snapshot. In response to receiving the second acknowledgment signal while uploading the second snapshot, the second label for the second block may be transitioned to indicate that the second block is an acknowledged block. The indication of the second block may be encoded within the second metadata. The encoding of the indication of the second block may be based on the second label for the second block indicating that the second block is an acknowledged block.

In some embodiments, the first set of data blocks includes a third data block. In response to determining that the inaccessible data store has become accessible while uploading the first snapshot may further comprise uploading the third block to the data store while uploading the second snapshot. An indication of the third block may be encoded within the second metadata. In such embodiments, the method may further include and in response to receiving a request to upload a third snapshot of the data object to the data store, generating a third snapshot identifier for the third snapshot of the data object. A second set of data blocks of the third snapshot may be identified within the data of the data object. The second set of data blocks may include at least an updated version of the first block and an updated version of the third block. Each block of the second set of data blocks may include data that is different from data of a corresponding block of at least one of the incomplete first snapshot or the complete of the object. The updated version of the first block and the updated version of the third block may be uploaded to the data store while uploading the third snapshot. An indication of the third snapshot identifier may be encoded within third metadata for the third snapshot. An indication of the updated first block, an indication of the updated third block, and an indication that the third snapshot is a complete snapshot may also be encoded in the third metadata.

In various embodiments, and in response to receiving a request to delete the second snapshot of the data object, the method may further include accessing the first metadata for the first snapshot, the second metadata for the second snapshot, and the third metadata for the third snapshot. In response to identifying within the first metadata that the first snapshot is an incomplete snapshot, the method may further include foregoing accessing previous metadata for the previous snapshot. In response to identifying that the third metadata includes the indication of the updated version of the first block and that the second metadata does not include an indication of the first block, the method may further include deleting the first block of the first snapshot and the indication of the first block in the first metadata. In response to identifying that the third metadata does not include an indication of the second block and that the second metadata includes the indication of the second block, the method may further include foregoing deleting the second block of the second snapshot and foregoing deleting the indication of the second block in the second metadata. In response to identifying that the third metadata includes the indication of the updated third block and that the second metadata does include the indication of the third data block, the method may further include deleting the third block of the second snapshot and deleting the indication of the third block in the second metadata.

In still additional embodiments, the indication of the first block in the first metadata may be a first n-tuple. The first n-tuple may include the first snapshot identifier as a first component and a logical address of the first bock as second component. The first component may be a more significant component than the second component. In some of these embodiments, the first n-tuple may represent a first key. The first metadata may further encode a second n-tuple that includes a first value that is paired with the first key. The second n-tuple may further include an identifier for a first data chunk that stores the first block as a first component and a value of a reference counter for the first data chunk as a second component. The first and second metadata may be encoded as key-value pairs in a copy-on-write (COW) B-Tree or a Log-Structured Merging Tree (LSM-Tree).

The method may further include employing a virtualized data center to identify the first set of data blocks. The virtualized data center may implements at least one of a virtual storage area network (vSAN), a virtual disk file system (vDFS), or a virtual machine (VM). An uploader agent of the virtualized data center may be employed to upload the first block to the data store while uploading the first snapshot.

In another embodiment, a method for storing data on a distributed computing system is performed. The distributed computing system may include a content aware store (CAS). The method may include receiving data of a data object. The data may be structured as an ordered set of data blocks. The data may be subdivided into an ordered set of data chunks. Each chunk in the set of data chunks may include an ordered subset of the set of data blocks. An associated chunk signature may be determined for each chunk in the set of data chunks. The chunk signature may be determined based on the subset of data blocks included in the chunk. A particular chunk of the set of data chunks may be selected. The selection of the particular chunk may be based on the order of the set of data chunks. A particular chunk signature may be associated with the particular chunk. A particular key for the particular chunk may be generated. The generation of the particular key may be based on a logical address and/or a block counter. It may be determined whether the particular chunk is a duplication of a previously selected chunk of the set of data chunks. The determination may be based on the particular signature and a duplicated signature that is associated with the previously selected chunk. The duplicated signature may be stored in the CAS. In response to determining that the particular chunk is the duplication of the previously selected chunk, a particular value for the particular key may be generations. The generation of the key may be based on a chunk identifier for the previously selected chunk and a particular number of blocks included in the particular chunk. In response to determining that the particular chunk is not the duplication of the previously selected chunk, a particular chunk identifier for the particular chunk may be allocated. In some embodiments, the particular chunk identifier may be based on a chunk counter. In further response to determining that the particular chunk is not a duplicated chunk, the particular value for the particular key may be generated based on the particular chunk identifier and the particular number of blocks. In still further response to determining that the particular chunk is not a duplicated chunk, the particular signature may be stored in the CAS and the chunk counter may be updated. The block counter may be updated based on the particular number of blocks. An association between the particular key and the particular value may be indicated in metadata for the data object.

In another embodiment, a method for uploading a first snapshot of a data object to an accessible data store is provided. The first snapshot may be identified by a snapshot identifier. The method may include identifying a first set of data blocks within data of the data object. The first set of blocks may include at least a first block and a second block. Each block of the first set of data blocks includes data that is different from data of a corresponding block of a previous snapshot of the object. In various embodiments, the first block may be uploaded to the accessible data store. In some embodiments, after the block is uploaded to the data store, it may be determined that the data store has become inaccessible. In response to determining that the data store has become inaccessible, first metadata for the first snapshot may be generated. The first metadata for the first snapshot may indicate at least the first snapshot identifier, the first block, and that the first snapshot is an incomplete snapshot. In some embodiments, after determining that the data store has become inaccessible, it may be determined that the inaccessible data store has now become accessible. In response to determining that the data store is now accessible, a second snapshot identifier for a second snapshot of the data object may be generated. The second block may be uploaded to the data store. Second metadata for the second snapshot may be generated. The second metadata may indicate the second snapshot identifier, the second block, and that the second snapshot is a complete snapshot.

In accordance with some implementations, a computer-readable storage medium (e.g., a non-transitory computer-readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for storing data on a distributed computing system, the method comprising:
   receiving data of a data object that is structured as an ordered set of data blocks;
   subdividing the data into an ordered set of data chunks such that each chunk in the set of data chunks includes an ordered subset of the set of data blocks;
   selecting a next chunk of the set of data chunks based on at least one of the order of the set of chunks or a previous chunk identifier for a previously selected chunk of the set of chunks;
   generating a key for the next chunk based on an indication of an initial block of the next chunk;
   generating a value for the key based on a number of blocks included in the next chunk and at least one of a next chunk identifier for the next chunk or another chunk identifier for a duplicated chunk; and
   updating metadata for the data object to indicate an association between the key for the next chunk and the value for the key.

2. The method of claim 1, further comprising:
   determining whether the next chunk is a duplication of another chunk based on a next signature for the next chunk and duplicated signature for the duplicated chunk, wherein the duplicated chunk has been previously selected;
   in response to determining that the next chunk is a duplication of another chunk:
     generating the value for the key based on the number of blocks included in the next chunk and another chunk identifier for the duplicated chunk; and
   in response to determining that the next chunk is not a duplication of another chunk:
     allocating the next chunk identifier for the next chunk based on a previous chunk identifier for the previously selected chunk;
     generating the value for the key based on the number of blocks included in the next chunk and the next chunk identifier for the next chunk; and
     updating a value for the previous chunk identifier to be the next chunk identifier.

3. The method of claim 2, wherein in response to determining that the next chunk is not a duplication of another chunk, the method further comprises:
   storing an association between the next signature and the next chunk identifier in a content aware store (CAS), wherein the CAS stores an association between the duplicated signature and the other chunk identifier for the duplicated chunk.

4. The method of claim 2, further comprising:
   in further response to determining that the next chunk is a duplication of another chunk:
     incrementing a value for a reference counter for the duplicated chunk; and
     generating the value for the key further based on the incremented value for the reference counter for the duplicated chunk;

in further response to determining that the next chunk is not a duplication of another chunk:
  initializing a value for a reference counter for the next chunk; and
  generating the value for the key further based on the initialized value for the reference counter for the next chunk.

5. The method of claim 1, further comprising:
for each chunk of the set of the data chunks, determining an associated chunk signature based on the subset of data blocks included in the chunk and a hash function.

6. The method of claim 1, further comprising:
sequentially assigning a unique logical block address (lba) to each block of the set of data blocks based on the ordering of the set of data blocks;
wherein the key for the next chunk encodes the lba of the initial block of the next chunk; and
wherein the value for the key encodes at least one of the number of sequential blocks in the next chunk or a number of contiguous chunks that in an ordered combination include a contiguous subset of the set of data blocks, such that the lba for each block in the next chunk is indicated by the order of the blocks included in the next chunk and a combination of the encoded lba of the initial block of the next chunk and the encoded number of blocks included in the next chunk.

7. The method of claim 1, further comprising:
employing a virtualized data center to provide the data of the data object, wherein the virtualized data center implements at least one of a virtual storage area network (vSAN), a virtual disk file system (vDFS), or a virtual machine (VM).

8. The method of claim 1, wherein the association between the key for the next chunk and the value for the key is encoded in a key-value pair of at least one of a copy-on-write (COW) B-tree or a log-structured merge tree (LSM-tree) included in the metadata for the data object.

9. The method of claim 1, further comprising:
storing each chunk of the set of chunks in an object data store, wherein the object data store employs a Log-Structured File System (LFS) and the set of data chunks is distributed over a set of data segments of the LFS such that each segment of the set of data segments includes a subset of the set of data chunks.

10. The method of claim 9, wherein the LFS addresses each block of the set of data blocks by a segment address of a segment addresses space and each chunk of the set of data chunks is uniquely identified by a chunk identifier of a set of sequential chunk identifiers, such that each chunk is addressed by chunk addresses of a chunk address space, the method further comprising:
generating a mapping for each chunk address of the chunk address space to a segment address of the segment address space.

11. A non-transitory computer-readable storage medium storing one or more programs configured to be executed by distributed computing system, one or more processors, and memory, the one or more programs including instructions for performing operations comprising:
receiving data of a data object that is structured as an ordered set of data blocks;
subdividing the data into an ordered set of data chunks such that each chunk in the set of data chunks includes an ordered subset of the set of data blocks;
selecting a next chunk of the set of data chunks based on at least one of the order of the set of chunks or a previous chunk identifier for a previously selected chunk of the set of chunks;
generating a key for the next chunk based on an indication of an initial block of the next chunk;
generating a value for the key based on a number of blocks included in the next chunk and at least one of a next chunk identifier for the next chunk or another chunk identifier for a duplicated chunk; and
updating metadata for the data object to indicate an association between the key for the next chunk and the value for the key.

12. The storage medium of claim 11, the operations further comprising:
determining whether the next chunk is a duplication of a another chunk based on a next signature for the next chunk and duplicated signature for the duplicated chunk, wherein the duplicated chunk has been previously selected;
in response to determining that the next chunk is a duplication of another chunk:
  generating the value for the key based on the number of blocks included in the next chunk and another chunk identifier for the duplicated chunk; and
in response to determining that the next chunk is not a duplication of another chunk:
  allocating the next chunk identifier for the next chunk based on a previous chunk identifier for the previously selected chunk;
  generating the value for the key based on the number of blocks included in the next chunk and the next chunk identifier for the next chunk; and
  updating a value for the previous chunk identifier to be the next chunk identifier.

13. The storage medium of claim 12, wherein in response to determining that the next chunk is not a duplication of another chunk, the operations further comprise:
storing an association between the next signature and the next chunk identifier in a content aware store (CAS), wherein the CAS stores an association between the duplicated signature and the other chunk identifier for the duplicated chunk.

14. The storage medium of claim 12, the operations further comprising:
in further response to determining that the next chunk is a duplication of another chunk:
  incrementing a value for a reference counter for the duplicated chunk; and
  generating the value for the key further based on the incremented value for the reference counter for the duplicated chunk;
in further response to determining that the next chunk is not a duplication of another chunk:
  initializing a value for a reference counter for the next chunk; and
  generating the value for the key further based on the initialized value for the reference counter for the next chunk.

15. The storage medium of claim 11, the operations further comprising:
for each chunk of the set of the data chunks, determining an associated chunk signature based on the subset of data blocks included in the chunk and a hash function.

16. The storage medium of claim 11, further comprising:
sequentially assigning a unique logical block address (lba) to each block of the set of data blocks based on the ordering of the set of data blocks;

wherein the key for the next chunk encodes the lba of the initial block of the next chunk; and wherein the value for the key encodes at least one of the number of sequential blocks in the next chunk or a number of contiguous chunks that in an ordered combination include a contiguous subset of the set of data blocks, such that the lba for each block in the next chunk is indicated by the order of the blocks included in the next chunk and a combination of the encoded lba of the initial block of the next chunk and the encoded number of blocks included in the next chunk.

17. The storage medium of claim 11, the operations further comprising:

employing a virtualized data center to provide the data of the data object, wherein the virtualized data center implements at least one of a virtual storage area network (vSAN), a virtual disk file system (vDFS), or a virtual machine (VM).

18. The storage medium of claim 11, wherein the association between the key for the next chunk and the value for the key is encoded in a key-value pair of at least one of a copy-on-write (COW) B-tree or a log-structured merge tree (LSM-tree) included in the metadata for the data object.

19. The storage medium of claim 11, the operations further comprising:

storing each chunk of the set of chunks in an object data store, wherein the object data store employs a Log-Structured File System (LFS) and the set of data chunks is distributed over a set of data segments of the LFS such that each segment of the set of data segments includes a subset of the set of data chunks.

20. The storage medium of claim 19, wherein the LFS addresses each block of the set of data blocks by a segment address of a segment addresses space and each chunk of the set of data chunks is uniquely identified by a chunk identifier of a set of sequential chunk identifiers, such that each chunk is addressed by chunk addresses of a chunk address space, the operations further comprising:

generating a mapping for each chunk address of the chunk address space to a segment address of the segment address space.

21. A distributed computing system for storing data, the system comprising:

one or more processors; and a memory storing one or more programs configured to be executed by the one or more processors, the one or more programs including instructions for performing operations comprising:

receiving data of a data object that is structured as an ordered set of data blocks;

subdividing the data into an ordered set of data chunks such that each chunk in the set of data chunks includes an ordered subset of the set of data blocks;

selecting a next chunk of the set of data chunks based on at least one of the order of the set of chunks or a previous chunk identifier for a previously selected chunk of the set of chunks;

generating a key for the next chunk based on an indication of an initial block of the next chunk;

generating a value for the key based on a number of blocks included in the next chunk and at least one of a next chunk identifier for the next chunk or another chunk identifier for a duplicated chunk; and updating metadata for the data object to indicate an association between the key for the next chunk and the value for the key.

22. The system of claim 21, the operations further comprising:

determining whether the next chunk is a duplication of a another chunk based on a next signature for the next chunk and duplicated signature for the duplicated chunk, wherein the duplicated chunk has been previously selected;

in response to determining that the next chunk is a duplication of another chunk:

generating the value for the key based on the number of blocks included in the next chunk and another chunk identifier for the duplicated chunk; and in response to determining that the next chunk is not a duplication of another chunk:

allocating the next chunk identifier for the next chunk based on a previous chunk identifier for the previously selected chunk;

generating the value for the key based on the number of blocks included in the next chunk and the next chunk identifier for the next chunk; and updating a value for the previous chunk identifier to be the next chunk identifier.

23. The system of claim 22, wherein in response to determining that the next chunk is not a duplication of another chunk, the operations further comprise:

storing an association between the next signature and the next chunk identifier in a content aware store (CAS), wherein the CAS stores an association between the duplicated signature and the other chunk identifier for the duplicated chunk.

24. The system of claim 22, the operations further comprising:

in further response to determining that the next chunk is a duplication of another chunk:

incrementing a value for a reference counter for the duplicated chunk; and generating the value for the key further based on the incremented value for the reference counter for the duplicated chunk;

in further response to determining that the next chunk is not a duplication of another chunk:

initializing a value for a reference counter for the next chunk; and generating the value for the key further based on the initialized value for the reference counter for the next chunk.

25. The system of claim 21, the operations further comprising:

for each chunk of the set of the data chunks, determining an associated chunk signature based on the subset of data blocks included in the chunk and a hash function.

26. The system of claim 21, the operations further comprising:

sequentially assigning a unique logical block address (lba) to each block of the set of data blocks based on the ordering of the set of data blocks;

wherein the key for the next chunk encodes the lba of the initial block of the next chunk; and wherein the value for the key encodes at least one of the number of sequential blocks in the next chunk or a number of contiguous chunks that in an ordered combination include a contiguous subset of the set of data blocks, such that the lba for each block in the next chunk is indicated by the order of the blocks included in the next chunk and a combination of the encoded lba of the initial block of the next chunk and the encoded number of blocks included in the next chunk.

27. The system of claim 21, the operations further comprising:
  employing a virtualized data center to provide the data of the data object, wherein the virtualized data center implements at least one of a virtual storage area network (vSAN), a virtual disk file system (vDFS), or a virtual machine (VM).

28. The system of claim 21, wherein the association between the key for the next chunk and the value for the key is encoded in a key-value pair of at least one of a copy-on-write (COW) B-tree or a log-structured merge tree (LSM-tree) included in the metadata for the data object.

29. The system of claim 21, the operations further comprising:
  storing each chunk of the set of chunks in an object data store, wherein the object data store employs a Log-Structured File System (LFS) and the set of data chunks is distributed over a set of data segments of the LFS such that each segment of the set of data segments includes a subset of the set of data chunks.

30. The system of claim 29, wherein the LFS addresses each block of the set of data blocks by a segment address of a segment addresses space and each chunk of the set of data chunks is uniquely identified by a chunk identifier of a set of sequential chunk identifiers, such that each chunk is addressed by chunk addresses of a chunk address space, the method further comprising: generating a mapping for each chunk address of the chunk address space to a segment address of the segment address space.

* * * * *